US011085247B2

United States Patent
Stack et al.

(10) Patent No.: US 11,085,247 B2
(45) Date of Patent: Aug. 10, 2021

(54) SECURING MEANS FOR IN-TUBING PROBE RETAINER

(71) Applicant: Evolution Engineering Inc., Calgary (CA)

(72) Inventors: Luke Anthony Stack, Calgary (CA); Aaron William Logan, Calgary (CA); Justin Christopher Logan, Calgary (CA); Patrick Robert Derkacz, Calgary (CA); Kurtis Kenneth Lee West, Calgary (CA); Robert Andrew Harris, Calgary (CA)

(73) Assignee: Evolution Engineering Inc., Calgary (CA)

( * ) Notice: Subject to any disclaimer, the term of this patent is extended or adjusted under 35 U.S.C. 154(b) by 228 days.

(21) Appl. No.: 16/073,731

(22) PCT Filed: Jan. 26, 2017

(86) PCT No.: PCT/CA2017/050080
§ 371 (c)(1),
(2) Date: Jul. 27, 2018

(87) PCT Pub. No.: WO2017/132754
PCT Pub. Date: Aug. 10, 2017

(65) Prior Publication Data
US 2019/0010765 A1 Jan. 10, 2019

Related U.S. Application Data

(60) Provisional application No. 62/288,129, filed on Jan. 28, 2016.

(51) Int. Cl.
*E21B 17/02* (2006.01)
*E21B 47/01* (2012.01)
(Continued)

(52) U.S. Cl.
CPC .............. *E21B 17/02* (2013.01); *E21B 23/03* (2013.01); *E21B 47/01* (2013.01); *F16D 1/0858* (2013.01)

(58) Field of Classification Search
CPC .......... E21B 17/02; E21B 23/03; E21B 47/01; E21B 17/1078; E21B 17/00; E21B 47/00;
(Continued)

(56) References Cited

U.S. PATENT DOCUMENTS

| 6,026,915 A | 2/2000 | Smith et al. |
| 2014/0259617 A1* | 9/2014 | Kompa ................... F16F 1/065 29/450 |

FOREIGN PATENT DOCUMENTS

| CA | 2890597 A1 | 5/2014 |
| CA | 2892710 A1 | 6/2014 |
| WO | WO2014085925 A1 | 6/2014 |

OTHER PUBLICATIONS

ISA/CA, International Search Report and Written Opinion for PCT Patent Application No. PCT/CA2017/050080, dated May 1, 2017.

* cited by examiner

*Primary Examiner* — Yong-Suk (Philip) Ro
(74) *Attorney, Agent, or Firm* — Oyen Wiggs Green & Mutala LLP

(57) ABSTRACT

An assembly for securing a probe retention member at a desired location within a tubular interior such as in a drill string collar. The assembly may use one or more securing members external to the retention member. In some embodiments most of the stresses from the probe retention structures of the retention member are isolated.

24 Claims, 17 Drawing Sheets

(51) Int. Cl.
*E21B 23/03* (2006.01)
*F16D 1/08* (2006.01)

(58) Field of Classification Search
CPC ...... E21B 23/02; E21B 47/011; E21B 47/122;
E21B 49/08; F16D 1/0858
See application file for complete search history.

SECURING MEANS FOR IN-TUBING PROBE RETAINER

CROSS REFERENCE TO RELATED APPLICATION(S)

This application is a U.S. National Stage application of International Application No. PCT/CA2017/050080 filed on Jan. 26, 2017, which claims the benefit of U.S. Provisional Patent Application No. 62/288,129 filed on Jan. 28, 2016, the entire content of all of which is incorporated by reference herein.

FIELD OF THE INVENTION

The present invention relates to means for axially and/or rotationally securing a cylindrical member such as a probe within the interior of a tubular member, and particularly to means for securing a probe within a sub used in downhole drilling.

BACKGROUND OF THE INVENTION

Recovering hydrocarbons from subterranean zones relies on the process of drilling wellbores. Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid usually in the form of a drilling "mud" is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; systems for telemetry of data to the surface; stabilizers; and heavy weight drill collars, pulsers and the like. The BHA is typically advanced into the wellbore by a string of metallic tubulars (drill pipe).

Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain real time data allows for relatively more economical and more efficient drilling operations. Various techniques have been used to transmit information from a location in a bore hole to the surface. These include transmitting information by generating vibrations in fluid in the bore hole (e.g. acoustic telemetry or mud pulse telemetry) and transmitting information by way of electromagnetic signals that propagate at least in part through the earth (EM telemetry). Other telemetry systems use hardwired drill pipe or fibre optic cable to carry data to the surface.

A typical arrangement for electromagnetic telemetry uses parts of the drill string as an antenna. The drill string may be divided into two conductive sections by including an insulating joint or connector (a "gap sub") in the drill string. The gap sub is typically placed within a BHA such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. The electromagnetic signals may be detected at the surface, for example by measuring electrical potential differences between the drill string and one or more ground rods.

In some embodiments the sensor or probe is positioned centrally within a collar or sub (an outer tubular member of the drill string), such as a grounding sub, with a retention member holding the probe in place. For example, in Patent Cooperation Treaty Application Publication No. WO/2014/085925 to the present applicant, a probe or electronics package is retained within a retention member or "spider" which has an outer rim connected to the centrally-disposed probe by means of radial arms, the spider outer rim in engagement with the sub interior walls. In one illustrated embodiment, the spider is axially secured against an internal ledge by means of a nut that engages internal threads on the interior walls. It is noted in that reference that the spider may be rotationally secured, as well, by modifying the spider outer rim such that it is keyed, splined or otherwise shaped to engage the interior wall of the sub.

However, it has been found that such a spider may undergo significant stresses during assembly of the collar or sub, and some designs may be susceptible to internal collapse. Also, modifying the spider by means such as keying and splining adds undesirable expense to the manufacturing process, particularly when the components wear through use and require replacement. For example, keying is a relatively high-cost solution that also involves a significant amount of lost material during manufacture.

What is needed, therefore, are novel means of securing a cylindrical member such as an electronics package within a tubular interior that reduce stresses on the spider while providing for simpler and less expensive maintenance.

SUMMARY OF THE INVENTION

The present invention therefore seeks to provide an assembly for retaining a cylindrical member within a tubular interior, where the retention member is axially and/or rotationally secured in place using components external to the retention member, or by separating the tubular member engagement means from the probe engagement means, in an effort to reduce stresses on the retention member itself and provide for simplified maintenance.

According to a first broad aspect of the present invention, there is provided an assembly for retaining a cylindrical member within a tubular member, the tubular member having an interior space defined by an inner wall of the tubular member, the inner wall comprising an internal upset, the assembly comprising:

a retention member configured to retain the cylindrical member, the retention member configured for receipt within the interior space and slip-fit engagement against the inner wall; and a press-fit ring configured for receipt within the interior space and press-fit engagement against the inner wall to secure the retention member against the internal upset.

In some exemplary embodiments of the first aspect, the cylindrical member is an electronics package comprising a sensor for data collection. The cylindrical member is preferably in electrical contact with the inner wall through the retention member when the assembly is secured within the interior space. The tubular member may be part of a drill string or part of a sub. The internal upset is preferably a shoulder extending into the interior space at least partially around the inner wall.

The retention member preferably comprises a peripheral portion for slidably engaging the inner wall, an inner portion for retaining the cylindrical member, and at least one connective member for connecting the peripheral portion to the inner portion. The assembly may further comprise a circumferential spring for securing the retention member against the inner wall, the spring for positioning in corresponding opposed channels in the inner wall and the retention member. Such a spring may be a canted coil spring.

The press-fit ring may comprise at least one axially-extending insert, and preferably a plurality of axially-extending inserts, configured for insertion in a corresponding recess in the retention member to rotationally secure the retention member within the interior space. The at least one axially-extending insert may be configured for slip-fit or press-fit engagement with the corresponding recess.

According to a second broad aspect of the present invention, there is provided a drill string tubular section for use in downhole data collection, the tubular section comprising:

an interior space defined by an inner wall, the inner wall comprising an internal upset;

a retention member retaining a cylindrical member, the cylindrical member for use in collecting data, the retention member within the interior space in slip-fit engagement against the inner wall; and a press-fit ring within the interior space and in press-fit engagement against the inner wall securing the retention member against the internal upset.

In some exemplary embodiments of the second aspect, the cylindrical member is an electronics package comprising a sensor. The cylindrical member is preferably in electrical contact with the inner wall through the retention member. The tubular section may be part of a sub. The internal upset is preferably a shoulder extending into the interior space at least partially around the inner wall.

The retention member preferably comprises a peripheral portion in slip-fit engagement against the inner wall, an inner portion retaining the cylindrical member, and at least one connective member connecting the peripheral portion to the inner portion. The tubular section may further comprise a circumferential spring for securing the retention member against the inner wall, the spring positioned in corresponding opposed channels in the inner wall and the retention member. Such a spring may be a canted coil spring.

The press-fit ring may comprise at least one axially-extending insert, and preferably a plurality of axially-extending inserts, inserted in a corresponding recess in the retention member to rotationally secure the retention member within the interior space. The at least one axially-extending insert may be configured for slip-fit or press-fit engagement with the corresponding recess.

According to a third broad aspect of the present invention, there is provided a sub for use in downhole telemetry applications, the sub comprising:

a tubular segment, the tubular segment comprising an interior space defined by an inner wall, the inner wall comprising an internal upset;

a retention member retaining a cylindrical member, the cylindrical member for use in collecting data, the retention member within the interior space in slip-fit engagement against the inner wall; and a press-fit ring within the interior space and in press-fit engagement against the inner wall securing the retention member against the internal upset.

In some exemplary embodiments of the third aspect, the cylindrical member is an electronics package comprising a sensor. The cylindrical member is preferably in electrical contact with the inner wall through the retention member. The internal upset is preferably a shoulder extending into the interior space at least partially around the inner wall.

The retention member preferably comprises a peripheral portion in slip-fit engagement against the inner wall, an inner portion retaining the cylindrical member, and at least one connective member connecting the peripheral portion to the inner portion. The sub may further comprise a circumferential spring for securing the retention member against the inner wall, the spring positioned in corresponding opposed channels in the inner wall and the retention member. Such a spring may be a canted coil spring.

The press-fit ring may comprise at least one axially-extending insert, and preferably a plurality of axially-extending inserts, inserted in a corresponding recess in the retention member to rotationally secure the retention member within the interior space. The at least one axially-extending insert may be configured for slip-fit or press-fit engagement with the corresponding recess.

According to a fourth broad aspect of the present invention, there is provided an assembly for retaining a cylindrical member within a tubular member, the tubular member having an interior space defined by an inner wall of the tubular member, the inner wall comprising an internal upset, the assembly comprising:

a press-fit ring configured for receipt within the interior space and press-fit engagement against the inner wall for abutting the internal upset;

a retention member configured to retain the cylindrical member, the retention member configured for receipt within the interior space and slip-fit engagement against the inner wall for abutting the press-fit ring; and the press-fit ring comprising at least one axially-extending insert configured for insertion in a corresponding recess in the retention member to secure the retention member within the interior space.

In some exemplary embodiments of the fourth aspect, the cylindrical member is an electronics package comprising a sensor for data collection. The cylindrical member is preferably in electrical contact with the inner wall through the retention member when the assembly is secured within the interior space. The tubular member may be part of a drill string or part of a sub. The internal upset is preferably a shoulder extending into the interior space at least partially around the inner wall.

The retention member preferably comprises a peripheral portion for slidably engaging the inner wall, an inner portion for retaining the cylindrical member, and at least one connective member for connecting the peripheral portion to the inner portion. The assembly may further comprise a circumferential spring for securing the retention member against the inner wall, the spring for positioning in corresponding opposed channels in the inner wall and the retention member. Such a spring may be a canted coil spring. The spring may be used to axially secure the retention member within the interior space.

The at least one axially-extending insert may comprise a plurality of axially-extending inserts. The at least one axially-extending insert may be integral with the press-fit ring, or it may be a discrete member configured for connection to the press-fit ring. In preferred embodiments, the at least one axially-extending insert rotationally secures the retention member within the interior space. The at least one axially-extending insert may be configured for slip-fit or press-fit engagement with the corresponding recess.

According to a fifth broad aspect of the present invention, there is provided a drill string tubular section for use in downhole data collection, the tubular section comprising:
- an interior space defined by an inner wall, the inner wall comprising an internal upset;
- a press-fit ring within the interior space and in press-fit engagement against the inner wall abutting the internal upset;
- a retention member retaining a cylindrical member, the cylindrical member for use in collecting data, the retention member within the interior space in slip-fit engagement against the inner wall abutting the press-fit ring; and
- a press-fit ring comprising at least one axially-extending insert inserted in a corresponding recess in the retention member to secure the retention member within the interior space.

In some exemplary embodiments of the fifth aspect, the cylindrical member is an electronics package comprising a sensor. The cylindrical member is preferably in electrical contact with the inner wall through the retention member. The tubular section may be part of a sub. The internal upset is preferably a shoulder extending into the interior space at least partially around the inner wall.

The retention member preferably comprises a peripheral portion in slip-fit engagement against the inner wall, an inner portion retaining the cylindrical member, and at least one connective member connecting the peripheral portion to the inner portion. The tubular section may further comprise a circumferential spring for securing the retention member against the inner wall, the spring positioned in corresponding opposed channels in the inner wall and the retention member. Such a spring may be a canted coil spring. The spring may be used to axially secure the retention member within the interior space.

The at least one axially-extending insert may comprise a plurality of axially-extending inserts. The at least one axially-extending insert may be integral with the press-fit ring, or it may be a discrete member configured for connection to the press-fit ring. In preferred embodiments, the at least one axially-extending insert rotationally secures the retention member within the interior space. The at least one axially-extending insert may be configured for slip-fit or press-fit engagement with the corresponding recess.

According to a sixth broad aspect of the present invention, there is provided a sub for use in downhole telemetry applications, the sub comprising:
- a tubular segment, the tubular segment comprising an interior space defined by an inner wall, the inner wall comprising an internal upset;
- a press-fit ring within the interior space and in press-fit engagement against the inner wall abutting the internal upset;
- a retention member retaining a cylindrical member, the cylindrical member for use in collecting data, the retention member within the interior space in slip-fit engagement against the inner wall abutting the press-fit ring; and
- the press-fit ring comprising at least one axially-extending insert inserted in a corresponding recess in the retention member to secure the retention member within the interior space.

In some exemplary embodiments of the sixth aspect, the cylindrical member is an electronics package comprising a sensor. The cylindrical member is preferably in electrical contact with the inner wall through the retention member. The internal upset is preferably a shoulder extending into the interior space at least partially around the inner wall.

The retention member preferably comprises a peripheral portion in slip-fit engagement against the inner wall, an inner portion retaining the cylindrical member, and at least one connective member connecting the peripheral portion to the inner portion. The sub may further comprise a circumferential spring for securing the retention member against the inner wall, the spring positioned in corresponding opposed channels in the inner wall and the retention member. Such a spring may be a canted coil spring. The spring may be used to axially secure the retention member within the interior space.

The at least one axially-extending insert may comprise a plurality of axially-extending inserts. The at least one axially-extending insert may be integral with the press-fit ring, or it may be a discrete member configured for connection to the press-fit ring. In preferred embodiments, the at least one axially-extending insert rotationally secures the retention member within the interior space. The at least one axially-extending insert may be configured for slip-fit or press-fit engagement with the corresponding recess.

According to a seventh broad aspect of the present invention, there is provided an assembly for retaining a cylindrical member within a tubular member, the tubular member having an interior space defined by an inner wall of the tubular member, the assembly comprising:
- a retention member configured to retain the cylindrical member, the retention member configured for receipt within the interior space and slip-fit engagement against the inner wall; and
- at least one insert configured for insertion in corresponding recesses in the retention member and the inner wall to axially and rotationally secure the retention member at a position within the interior space.

In some exemplary embodiments of the seventh aspect, the cylindrical member is an electronics package comprising a sensor for data collection. The cylindrical member is preferably in electrical contact with the inner wall through the retention member when the assembly is secured within the interior space. The tubular member may be part of a drill string or part of a sub.

The assembly may further comprise a press-fit ring configured for receipt within the interior space and press-fit engagement against the inner wall to further secure the retention member within the interior space.

In some embodiments, the inner wall comprises an internal upset, the retention member configured for abutting the internal upset to further axially secure the retention member within the interior space. In related embodiments, the assembly may further comprise a press-fit ring configured for receipt within the interior space and press-fit engagement against the inner wall, to secure the retention member against the internal upset within the interior space. The internal upset is preferably a shoulder extending into the interior space at least partially around the inner wall.

The retention member preferably comprises a peripheral portion for slidably engaging the inner wall, an inner portion for retaining the cylindrical member, and at least one connective member for connecting the peripheral portion to the inner portion.

The assembly may further comprise a circumferential spring for securing the retention member against the inner wall, the spring for positioning in corresponding opposed channels in the inner wall and the retention member. Such a spring may be a canted coil spring. The spring may be used to axially secure the retention member within the interior space.

The at least one insert may comprise a plurality of inserts. The at least one insert is preferably replaceable when worn, or replaceable by at least one larger insert where the corresponding recesses become worn. The at least one insert may be generally rectangular in shape, generally cylindrical in shape, or comprise at least one spherical member. The at least one insert may be configured for slip-fit or press-fit engagement with the corresponding recesses.

In some embodiments including an internal upset, the corresponding recess in the inner wall extends at least partially into the internal upset.

In some embodiments including a retention member having a peripheral portion, the corresponding recesses may extend beyond an end of the peripheral portion of the retention member, but they may alternatively extend no farther than an end of the peripheral portion of the retention member.

According to an eighth broad aspect of the present invention, there is provided a drill string tubular section for use in downhole data collection, the tubular section comprising:
- an interior space defined by an inner wall;
- a retention member configured to retain a cylindrical member, the cylindrical member for use in collecting data, the retention member within the interior space and in slip-fit engagement against the inner wall; and
- at least one insert inserted in corresponding recesses in the retention member and the inner wall to axially and rotationally secure the retention member at a position within the interior space.

In some exemplary embodiments of the eighth aspect, the cylindrical member is an electronics package comprising a sensor. The cylindrical member is preferably in electrical contact with the inner wall through the retention member. The tubular section may be part of a sub.

The tubular section may further comprise a press-fit ring within the interior space and in press-fit engagement against the inner wall to further secure the retention member within the interior space.

In some embodiments, the inner wall comprises an internal upset, the retention member abutting the internal upset to further axially secure the retention member within the interior space. In related embodiments, the assembly may further comprise a press-fit ring within the interior space and in press-fit engagement against the inner wall, to secure the retention member against the internal upset within the interior space. The internal upset is preferably a shoulder extending into the interior space at least partially around the inner wall.

The retention member preferably comprises a peripheral portion in slip-fit engagement against the inner wall, an inner portion retaining the cylindrical member, and at least one connective member connecting the peripheral portion to the inner portion.

The tubular section may further comprise a circumferential spring securing the retention member against the inner wall, the spring positioned in corresponding opposed channels in the inner wall and the retention member. Such a spring may be a canted coil spring. The spring may be used to axially secure the retention member within the interior space.

The at least one insert may comprise a plurality of inserts. The at least one insert is preferably replaceable when worn, or replaceable by at least one larger insert where the corresponding recesses become worn. The at least one insert may be generally rectangular in shape, generally cylindrical in shape, or comprise at least one spherical member. The at least one insert may be configured for slip-fit or press-fit engagement with the corresponding recesses.

In some embodiments including an internal upset, the corresponding recess in the inner wall extends at least partially into the internal upset.

In some embodiments including a retention member having a peripheral portion, the corresponding recesses may extend beyond an end of the peripheral portion of the retention member, but they may alternatively extend no farther than an end of the peripheral portion of the retention member.

According to a ninth broad aspect of the present invention, there is provided a sub for use in downhole telemetry applications, the sub comprising:
- a tubular segment, the tubular segment comprising an interior space defined by an inner wall;
- a retention member configured to retain a cylindrical member, the cylindrical member for use in collecting data, the retention member within the interior space and in slip-fit engagement against the inner wall; and
- at least one insert inserted in corresponding recesses in the retention member and the inner wall to axially and rotationally secure the retention member at a position within the interior space.

In some exemplary embodiments of the ninth aspect, the cylindrical member is an electronics package comprising a sensor. The cylindrical member is preferably in electrical contact with the inner wall through the retention member.

The sub may further comprise a press-fit ring within the interior space and in press-fit engagement against the inner wall to further secure the retention member within the interior space.

In some embodiments, the inner wall comprises an internal upset, the retention member abutting the internal upset to further axially secure the retention member within the interior space. In related embodiments, the sub may further comprise a press-fit ring within the interior space and in press-fit engagement against the inner wall, to secure the retention member against the internal upset within the interior space. The internal upset is preferably a shoulder extending into the interior space at least partially around the inner wall.

The retention member preferably comprises a peripheral portion in slip-fit engagement against the inner wall, an inner portion retaining the cylindrical member, and at least one connective member connecting the peripheral portion to the inner portion.

The sub may further comprise a circumferential spring securing the retention member against the inner wall, the spring positioned in corresponding opposed channels in the inner wall and the retention member. Such a spring may be a canted coil spring. The spring may be used to axially secure the retention member within the interior space.

The at least one insert may comprise a plurality of inserts. The at least one insert is preferably replaceable when worn, or replaceable by at least one larger insert where the corresponding recesses become worn. The at least one insert may be generally rectangular in shape, generally cylindrical in shape, or comprise at least one spherical member. The at least one insert may be configured for slip-fit or press-fit engagement with the corresponding recesses.

In some embodiments including an internal upset, the corresponding recess in the inner wall extends at least partially into the internal upset.

In some embodiments including a retention member having a peripheral portion, the corresponding recesses may extend beyond an end of the peripheral portion of the retention member, but they may alternatively extend no farther than an end of the peripheral portion of the retention member.

According to a tenth broad aspect of the present invention, there is provided an assembly for retaining a cylindrical member within a tubular member, the tubular member having an interior space defined by an inner wall of the tubular member, the inner wall comprising at least one recess, the assembly comprising:
- a retention member configured to retain the cylindrical member, the retention member configured for receipt within the interior space and slip-fit engagement against the inner wall; and
- the retention member comprising:
  - at least one inner member axially moveable in a first direction; and
  - at least one corresponding outer member disallowed from axial movement but radially moveable;
  - the at least one inner member comprising an inner member face directed outwardly and in the first direction; and
  - the at least one outer member comprising an outer member face directed inwardly and in facial contact with the inner member face;
  - wherein when the at least one inner member is moved axially in the first direction, the inner member face presses against the outer member face, thereby moving the at least one outer member radially outwardly into the at least one recess and securing the retention member axially and rotationally within the interior space.

In some exemplary embodiments of the tenth aspect, the cylindrical member is an electronics package comprising a sensor for data collection. The cylindrical member is preferably in electrical contact with the inner wall through the retention member when the assembly is secured within the interior space. The tubular member may be part of a drill string or part of a sub.

The retention member preferably comprises a peripheral portion for slidably engaging the inner wall, an inner portion for retaining the cylindrical member, and at least one connective member for connecting the peripheral portion to the inner portion.

In some embodiments, the at least one recess is a plurality of recesses, the at least one inner member is a corresponding plurality of inner members and the at least one outer member is a corresponding plurality of outer members.

In some embodiments, the at least one inner member is housed within an axial channel in the retention member, and in some embodiments the at least one outer member is housed within a radial channel in the retention member.

The retention member may comprise a screw for moving the at least one inner member in the first direction. In such a case, the at least one outer member may be biased away from the at least one recess, such that backing off the screw releases the at least one outer member from the at least one recess to allow removal of the retention member from the interior space.

According to an eleventh broad aspect of the present invention, there is provided a drill string tubular section for use in downhole data collection, the tubular section comprising:
- an interior space defined by an inner wall, the inner wall comprising at least one recess;
- a retention member configured to retain a cylindrical member, the cylindrical member for use in collecting data, the retention member within the interior space and in slip-fit engagement against the inner wall; and
- the retention member comprising:
  - at least one inner member axially moveable in a first direction; and
  - at least one corresponding outer member disallowed from axial movement but radially moveable;
  - the at least one inner member comprising an inner member face directed outwardly and in the first direction; and
  - the at least one outer member comprising an outer member face directed inwardly and in facial contact with the inner member face;
  - wherein when the at least one inner member is moved axially in the first direction, the inner member face presses against the outer member face, thereby moving the at least one outer member radially outwardly into the at least one recess and securing the retention member axially and rotationally within the interior space.

In some exemplary embodiments of the eleventh aspect, the cylindrical member is an electronics package comprising a sensor for data collection. The cylindrical member is preferably in electrical contact with the inner wall through the retention member. The tubular member may be part of a sub.

The retention member preferably comprises a peripheral portion for slidably engaging the inner wall, an inner portion for retaining the cylindrical member, and at least one connective member for connecting the peripheral portion to the inner portion.

In some embodiments, the at least one recess is a plurality of recesses, the at least one inner member is a corresponding plurality of inner members and the at least one outer member is a corresponding plurality of outer members.

In some embodiments, the at least one inner member is housed within an axial channel in the retention member, and in some embodiments the at least one outer member is housed within a radial channel in the retention member.

The retention member may comprise a screw for moving the at least one inner member in the first direction. In such a case, the at least one outer member may be biased away from the at least one recess, such that backing off the screw releases the at least one outer member from the at least one recess to allow removal of the retention member from the interior space.

According to a twelfth broad aspect of the present invention, there is provided a sub for use in downhole telemetry applications, the sub comprising:
- a tubular segment, the tubular segment comprising an interior space defined by an inner wall, the inner wall comprising at least one recess;
- a retention member configured to retain a cylindrical member, the cylindrical member for use in collecting data, the retention member within the interior space and in slip-fit engagement against the inner wall; and the retention member comprising:
  at least one inner member axially moveable in a first direction; and
  at least one corresponding outer member disallowed from axial movement but radially moveable;
  the at least one inner member comprising an inner member face directed outwardly and in the first direction; and
  the at least one outer member comprising an outer member face directed inwardly and in facial contact with the inner member face;
wherein when the at least one inner member is moved axially in the first direction, the inner member face presses against the outer member face, thereby moving the at least one outer member radially outwardly into the at least one recess and securing the retention member axially and rotationally within the interior space.

In some exemplary embodiments of the twelfth aspect, the cylindrical member is an electronics package comprising a sensor for data collection. The cylindrical member is preferably in electrical contact with the inner wall through the retention member.

The retention member preferably comprises a peripheral portion for slidably engaging the inner wall, an inner portion for retaining the cylindrical member, and at least one connective member for connecting the peripheral portion to the inner portion.

In some embodiments, the at least one recess is a plurality of recesses, the at least one inner member is a corresponding plurality of inner members and the at least one outer member is a corresponding plurality of outer members.

In some embodiments, the at least one inner member is housed within an axial channel in the retention member, and in some embodiments the at least one outer member is housed within a radial channel in the retention member.

The retention member may comprise a screw for moving the at least one inner member in the first direction. In such a case, the at least one outer member may be biased away from the at least one recess, such that backing off the screw releases the at least one outer member from the at least one recess to allow removal of the retention member from the interior space.

According to a thirteenth broad aspect of the present invention, there is provided a retention member for retaining a cylindrical member within a tubular member, the tubular member having an interior space defined by an inner wall of the tubular member, the inner wall comprising an internal upset, the retention member comprising:
  a press-fit portion for engaging the inner wall to axially and rotationally secure the retention member against the internal upset; and
  a slip-fit portion axially adjacent to the press-fit portion and configured to retain the cylindrical member within the interior space.

In some exemplary embodiments of the thirteenth aspect, the cylindrical member is an electronics package comprising a sensor for data collection. The cylindrical member is preferably in electrical contact with the inner wall through the retention member when the retention member is secured within the interior space. The tubular member may be part of a drill string or part of a sub. The internal upset is preferably a shoulder extending into the interior space at least partially around the inner wall.

The slip-fit portion preferably comprises a peripheral portion for slidably engaging the inner wall, an inner portion for retaining the cylindrical member, and at least one connective member for connecting the peripheral portion to the inner portion.

Once assembled, the press-fit portion may be disposed between the slip-fit portion and the internal upset and configured to abut the internal upset. Alternatively, the slip-fit portion may be disposed between the press-fit portion and the internal upset and configured to abut the internal upset.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention:

FIG. 1b is a sectional view of the embodiment of FIG. 1a;

FIG. 2b is a sectional view of the embodiment of FIG. 2a;

FIG. 4b is a sectional view of the embodiment of FIG. 4a;

FIG. 6b is a sectional view of the embodiment of FIG. 6a;

FIG. 7b is an exploded view of the embodiment of FIGS. 6a, 6b and 7a;

FIG. 8b is a detailed sectional view of the embodiment of FIG. 8a;

FIG. 9b is a sectional view of the embodiment of FIG. 9a;

FIG. 11b is a sectional view of the embodiment of FIG. 11a;

FIG. 12b is a sectional view of the embodiment of FIG. 12a;

FIG. 14b is a perspective view from the slip-fit portion end of the retention member of FIG. 14a; and FIG. 14c is a perspective view from the press-fit portion end of the retention member of FIG. 14a.

Exemplary embodiments of the present invention will now be described with reference to the accompanying drawings.

DETAILED DESCRIPTION OF EXEMPLARY EMBODIMENTS

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the invention to the precise forms of any exemplary embodiment. Accordingly, the description and drawings are to be regarded in an illustrative, rather than a restrictive, sense.

Figure 1A:
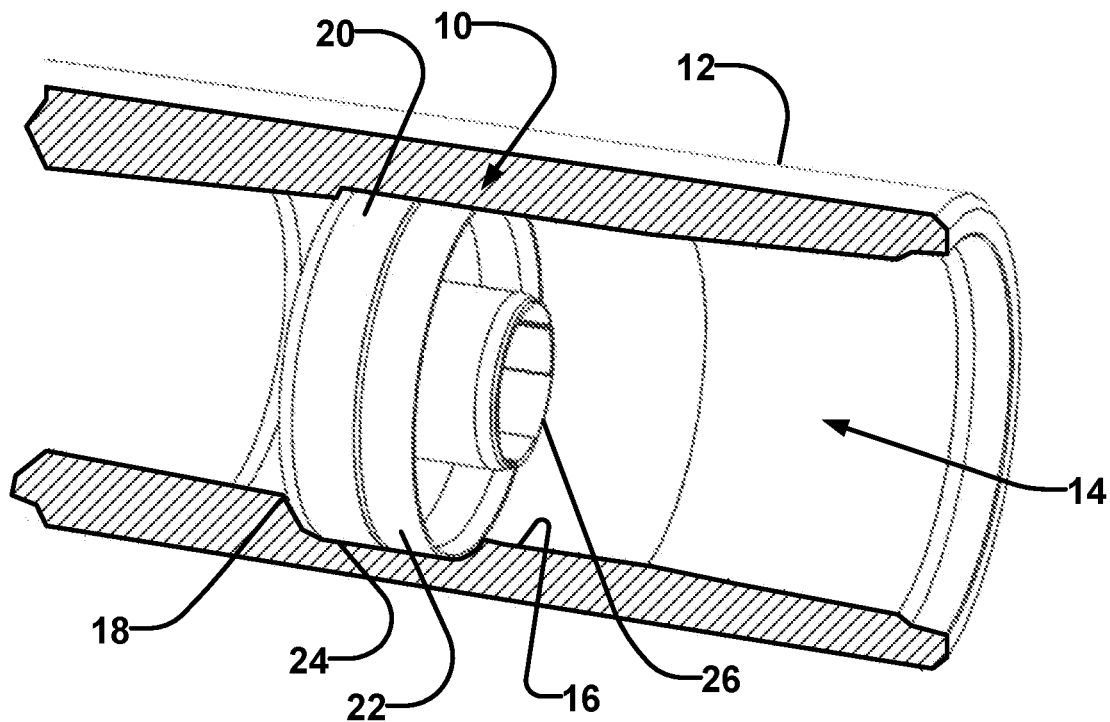
FIG. 1a is a perspective view, partly transparent, of an exemplary embodiment with a ring holding a retention member against an internal upset.
Figure 1B:
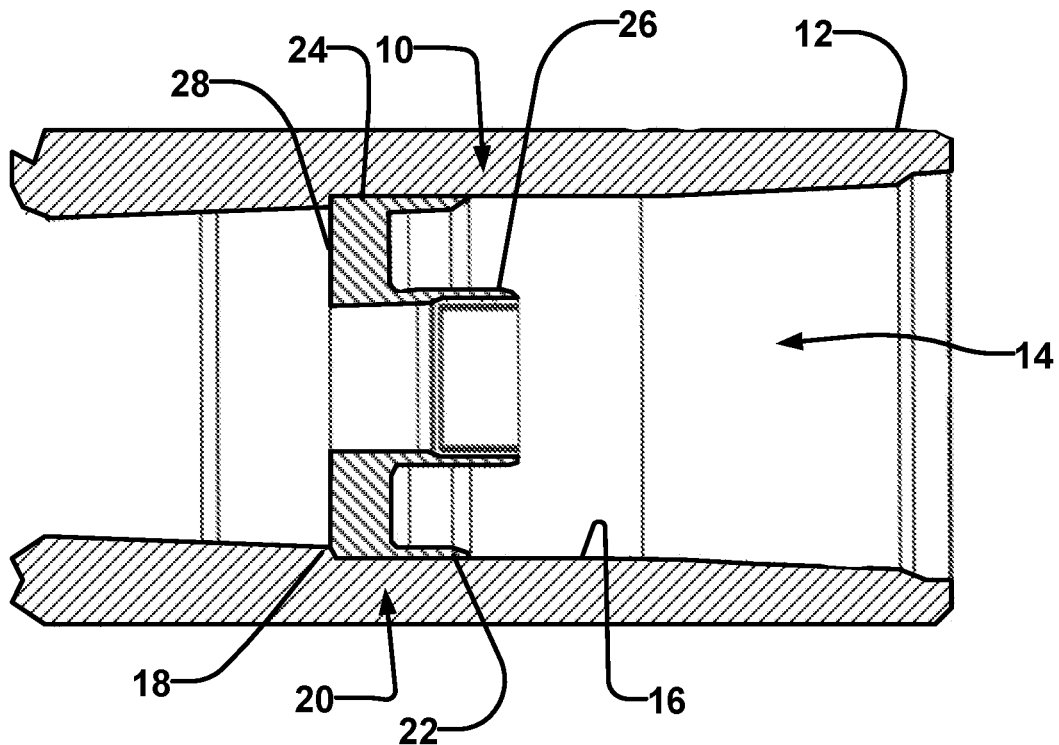

Turning to FIGS. 1a and 1b, a first embodiment of the present invention is illustrated. In this embodiment, an assembly 10 is shown retained in a tubular member 12. The assembly 10 comprises a retention member or spider 20 configured to retain an electronics package in the form of a cylindrical member, comprising a probe or sensor (not shown), and a press-fit ring 22. The spider 20 is generally wheel-shaped, with an outer peripheral portion 24, an inner portion 26 for retaining the electronics package, and spoke-like connective members 28 for connecting the peripheral portion 24 to the inner portion 26. The inner portion 26 has a central bore therethrough sized for receiving a desired electronics package.

As described above, the tubular member 12 could be part of a drill string, such as part of a grounding sub, although the tubular member 12 is not limited to that context. The tubular member 12 has a bore therethrough to form an interior space 14, which interior space 14 is defined by the inner wall 16 of the tubular member 12. The assembly 10 is sized and configured for receipt in the interior space 14. When secured within the interior space 14, the electronics package would be in electrical contact with the inner wall 16 through the spider 20, where the context renders that desirable.

As can best be seen in FIG. 1b, the inner wall 16 comprises a peripheral shoulder or ledge 18, although other forms of internal upset short of a full peripheral shoulder may provide the desired functionality. The purpose of the shoulder 18 is to provide an internal location to land the spider 20, to prevent it from further axial movement within the interior space 14 in the direction of insertion. The spider 20 is configured for slip-fit engagement against the inner wall 16, and once the spider 20 is inserted into place against the shoulder 18, the press-fit ring 22 is inserted to press the spider 20 against the shoulder 18 and secure the spider 20 against axial movement against the direction of insertion. In the illustrated embodiment of FIGS. 1a and 1b, the press-fit ring 22 alone provides the means to secure the spider 20 against the shoulder 18 by frictional engagement with the inner wall 16.

By securing the spider 20 between the internal upset 18 and a press-fit ring 22, the spider 20 that holds the sensor or probe is insulated from some of the significant stresses during assembly of the grounding sub which might otherwise contribute to damage or even collapse of a spider, particularly where the spider is press fit within the sub. Also, the costs of conventional securing means such as keying and splining are avoided, and if the press-fit ring 22 becomes worn or damaged it can be relatively simple and inexpensive to replace when compared to a keyed spider.

Figure 2A:
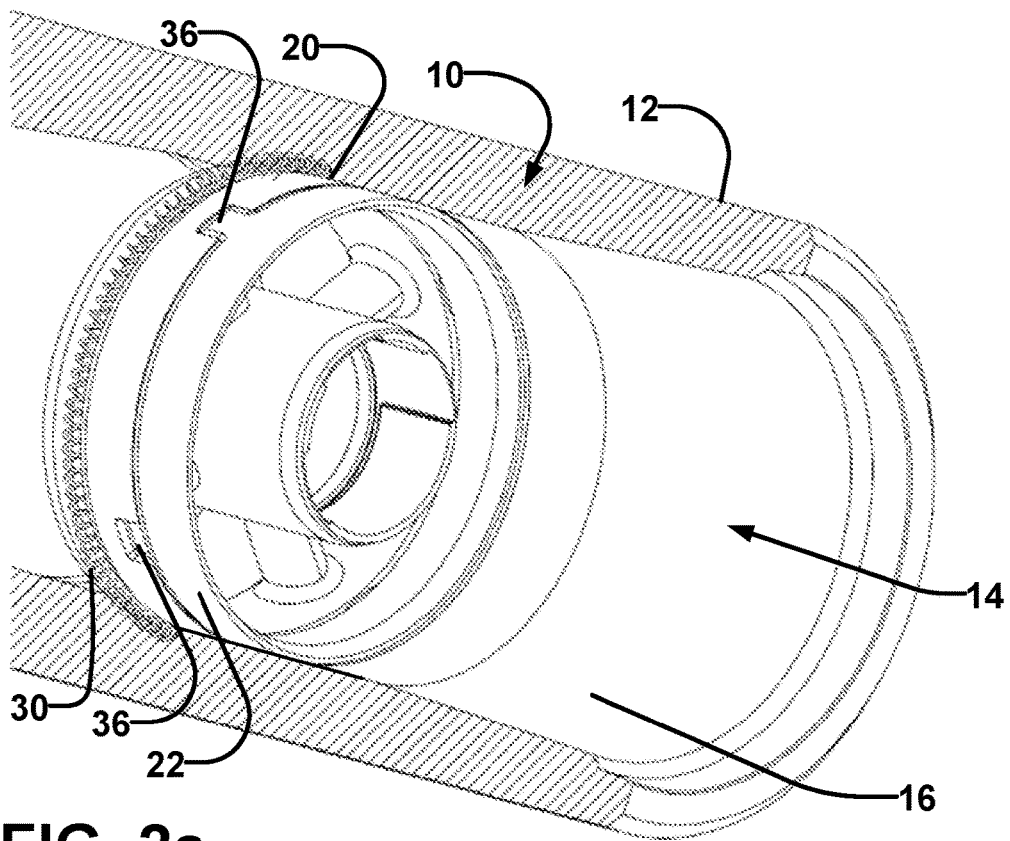
FIG. 2a is a perspective view, partly transparent, of the embodiment of FIGS. 1a and 1b with a spring, with a press-fit ring comprising an axially extending insert.
Figure 2B:
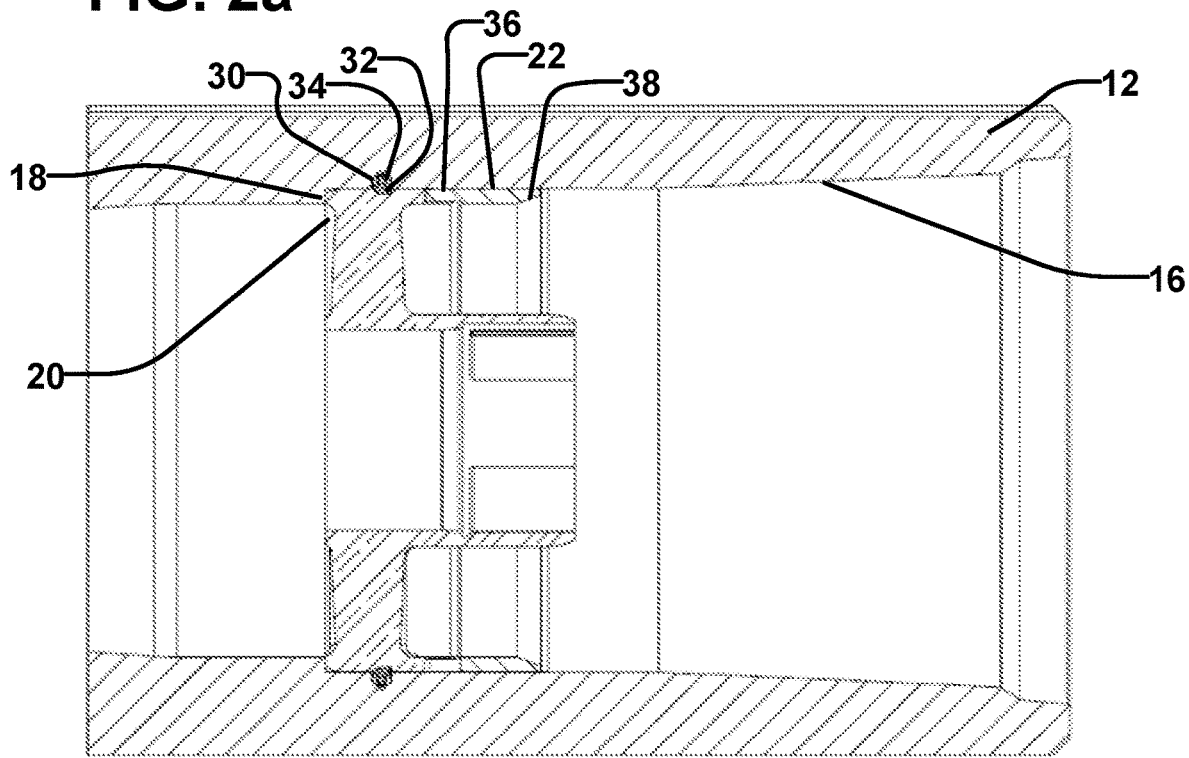

While the press-fit ring 22 alone may be sufficient to axially secure the spider 20 against the upset 18, additional securing means may be optionally incorporated where desired. For example, FIGS. 2a and 2b illustrate a further embodiment wherein additional axial and rotational locking means are provided. In this further embodiment, the peripheral portion 24 of the spider 20 is provided with a peripheral channel or groove 32, and the inner wall 16 is provided with a corresponding channel 34, which channels 32, 34 are sized and configured to retain a circumferential spring 30. By locating the spring 30 in the channels 32, 34, the spider 20 is further secured against axial movement within the interior space 14. In one preferred embodiment, the spring 30 is a canted coil spring such as the Bal Spring™ produced by Bal Seal Engineering, Inc. of Foothill Ranch, Calif., but the actual spring employed should be selected based on design requirements as would be known to those skilled in the art.

Further, the embodiment of FIGS. 2a and 2b shows the use of inserts 36 extending in the direction of insertion from the leading edge of the press-fit ring 22 to engage with the spider 20. In this embodiment the inserts 36 are formed integral with the ring 22 and are sized and configured to mate with corresponding recesses 38 on the peripheral portion 24 of the spider 20. It will be obvious to those skilled in the art that the inserts 36 could alternatively be manufactured as discrete components that mate with both the ring 22 and the spider 20. After the spider 20 is positioned against the shoulder 18 with the spring 30 located in the channels 32, 34, the ring 22 is inserted such that the inserts 36 engage the recesses 38 of the spider 20. In this way, the spider is also rotationally secured. Since rotational stresses would be carried in large part by the inserts 36 and the ring 22, any wear or damage from use of the tool would be more readily addressed than if the spider 20 had incorporated integral structural locking features like a key or splines. The inserts 36 may be configured for slip-fit or press-fit engagement with the corresponding recesses 38.

FIGS. 3a to 7b illustrate further embodiments of the present invention. In these embodiments, the press-fit ring itself is located against the internal upset, with one or more inserts extending away from the upset to engage the spider and rotationally secure the spider.

Figure 3A:
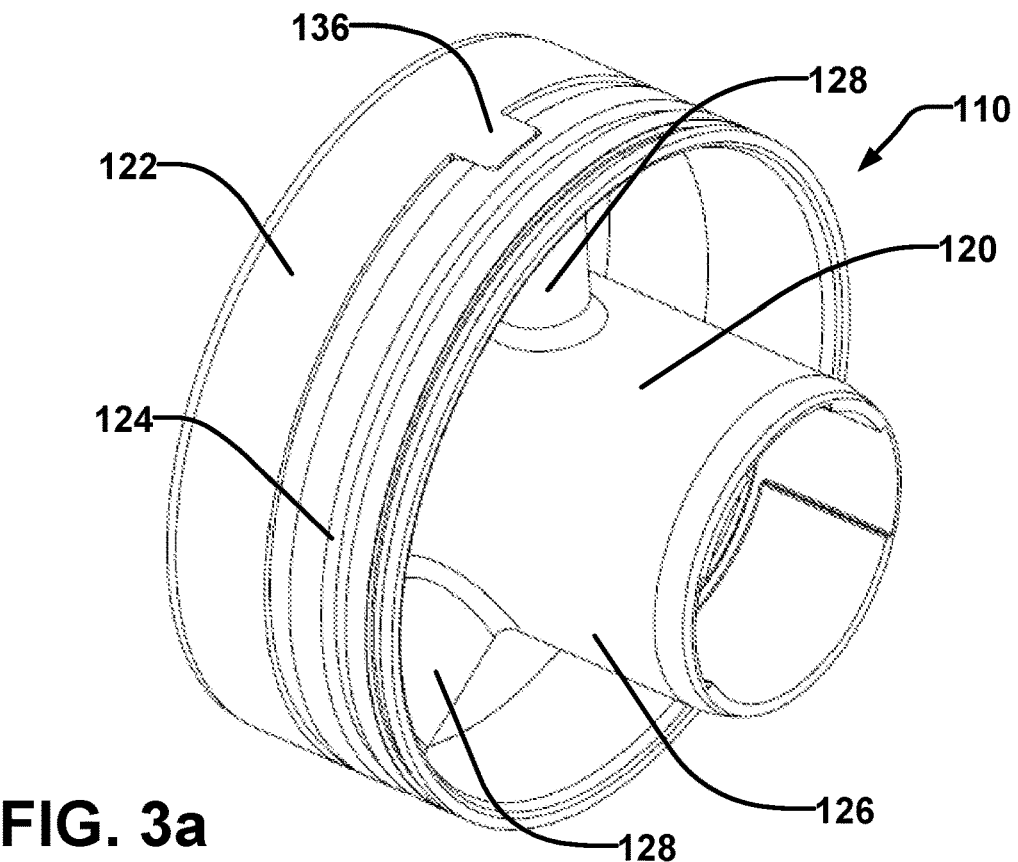
FIG. 3a is a perspective view of an exemplary embodiment with a ring abutting an internal upset and having an insert rotationally securing a retention member.

FIG. 3a illustrates a simple embodiment wherein an assembly 110 comprises a press-fit ring 122 and a spider 120. The ring 122 comprises a single insert 136 sized and configured for insertion into a corresponding recess 138 in the spider 120 (shown best in FIG. 5), although a plurality of inserts 136 and corresponding recesses 138 could be employed, and the insert(s) 136 may be configured for slip-fit or press-fit engagement with the corresponding recess(es) 138. As with the embodiment of FIGS. 1a to 2b, the spider 120 comprises a peripheral portion 124, an inner portion 126, and connective members 128 to connect the peripheral and inner portions 124, 126, and the recess 138 is located in the peripheral portion 124.

Figure 3B:
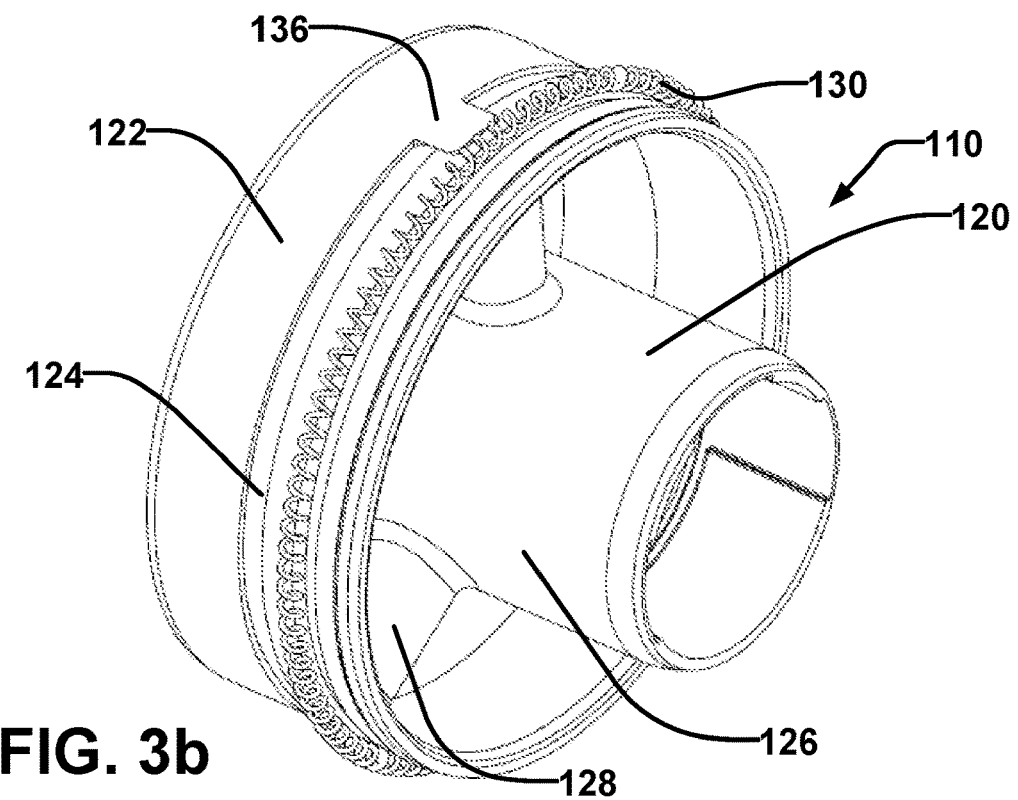
FIG. 3b is a perspective view of the embodiment of FIG. 3a with a spring.

FIG. 3b illustrates an embodiment of the assembly 110 wherein a circumferential spring 130 is located in a channel 132 in the peripheral portion 124. As is discussed above, the spring 130 is preferably a canted coil spring such as the Bal Spring™ produced by Bal Seal Engineering, Inc. of Foothill Ranch, Calif., but the actual spring employed should be selected based on design requirements as would be known to those skilled in the art.

Figure 4A:
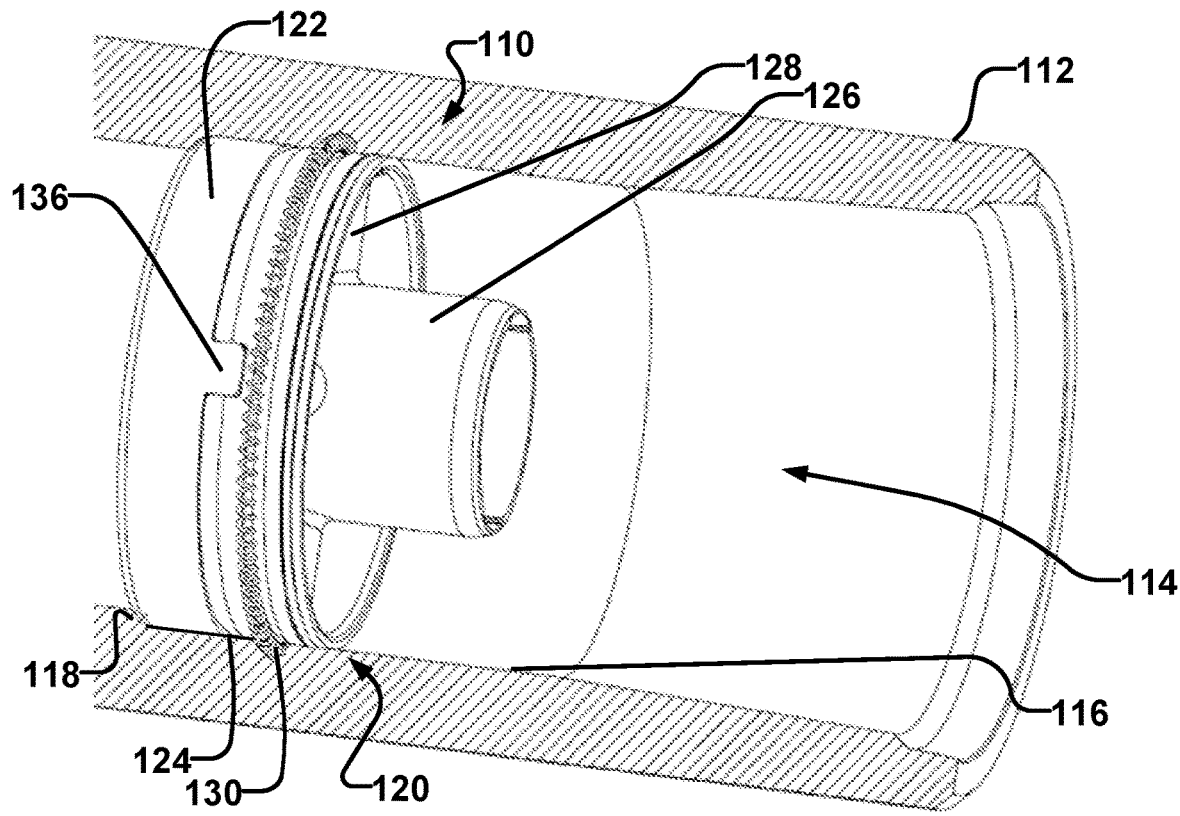
FIG. 4a is a perspective view, partly transparent, of the embodiment of FIG. 3b with a spring.
Figure 4B:
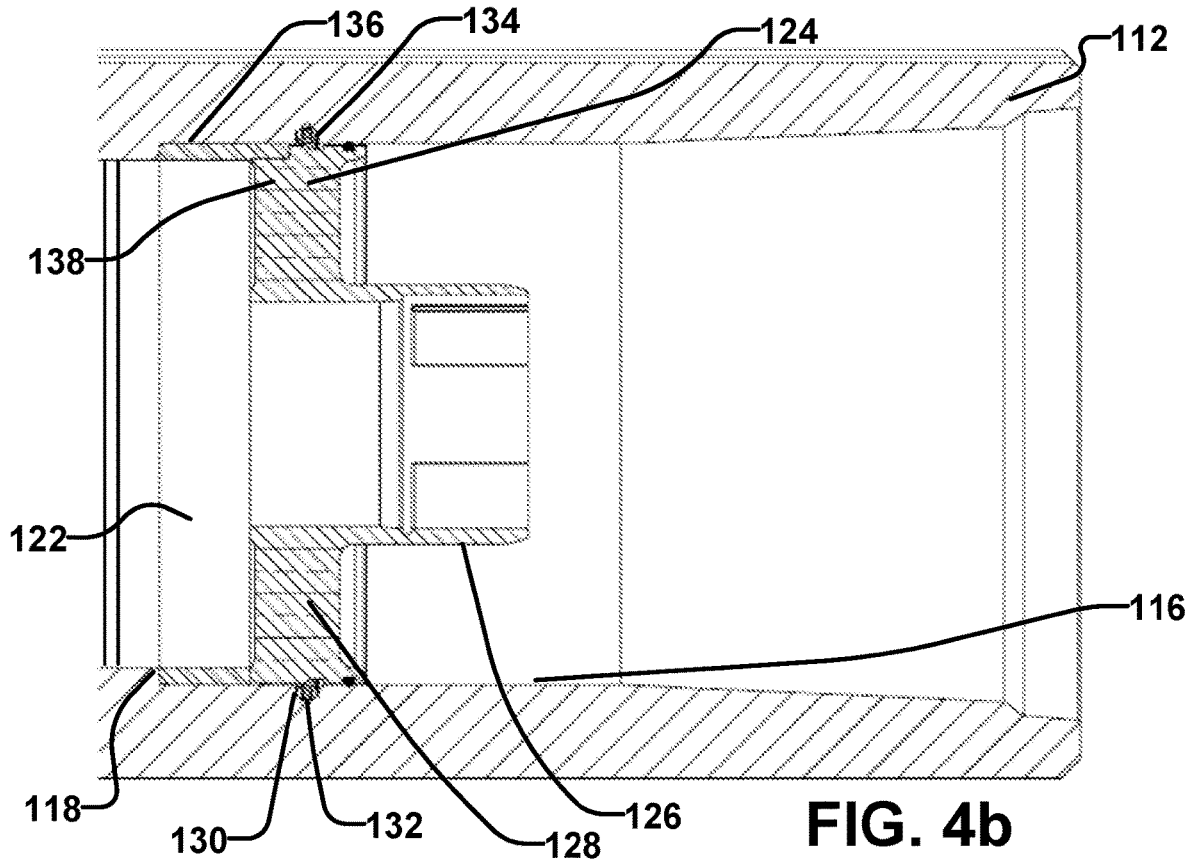

FIGS. 4a and 4b illustrate the embodiment of FIG. 3b positioned within a tubular member 112. The tubular member 112 comprises an interior space 114 defined by an inner wall 116 of the tubular member 112, and the inner wall 116 comprises an internal upset or shoulder 118 for use in locating the assembly 110. The inner wall 116 also comprises a channel 134 for receiving the spring 130. The ring 122 is first press fit into the interior space 114 until it abuts the shoulder 118, with the insert 136 extending in a direction opposite the shoulder 118. The spider 120 is then inserted into the interior space 114 in slip-fit engagement with the inner wall 116 until the spider 120 meets the ring 122. The spider 120 is rotated until the recess 138 aligns with the insert 136, and then the spider 120 is pressed against the ring 122 to engage the insert 136 within the recess 138 (which may be a slip-fit or press-fit engagement) and rotationally lock the spider 120. At this point the spring 130 will also engage with the channel 134 to axially lock the spider 120. Thus, the spider 120 is axially and rotationally secured at a desired location within the interior space 114.

Figure 5:
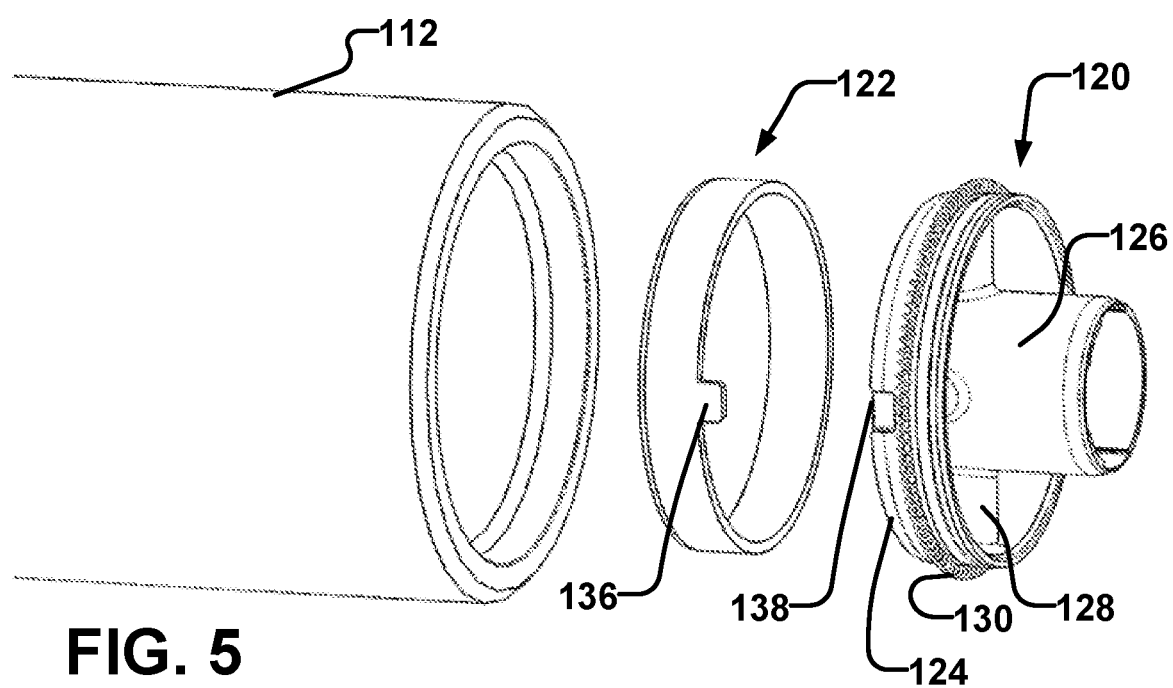
FIG. 5 is an exploded view of the embodiment of FIGS. 4a and 4b.
Figure 6A:
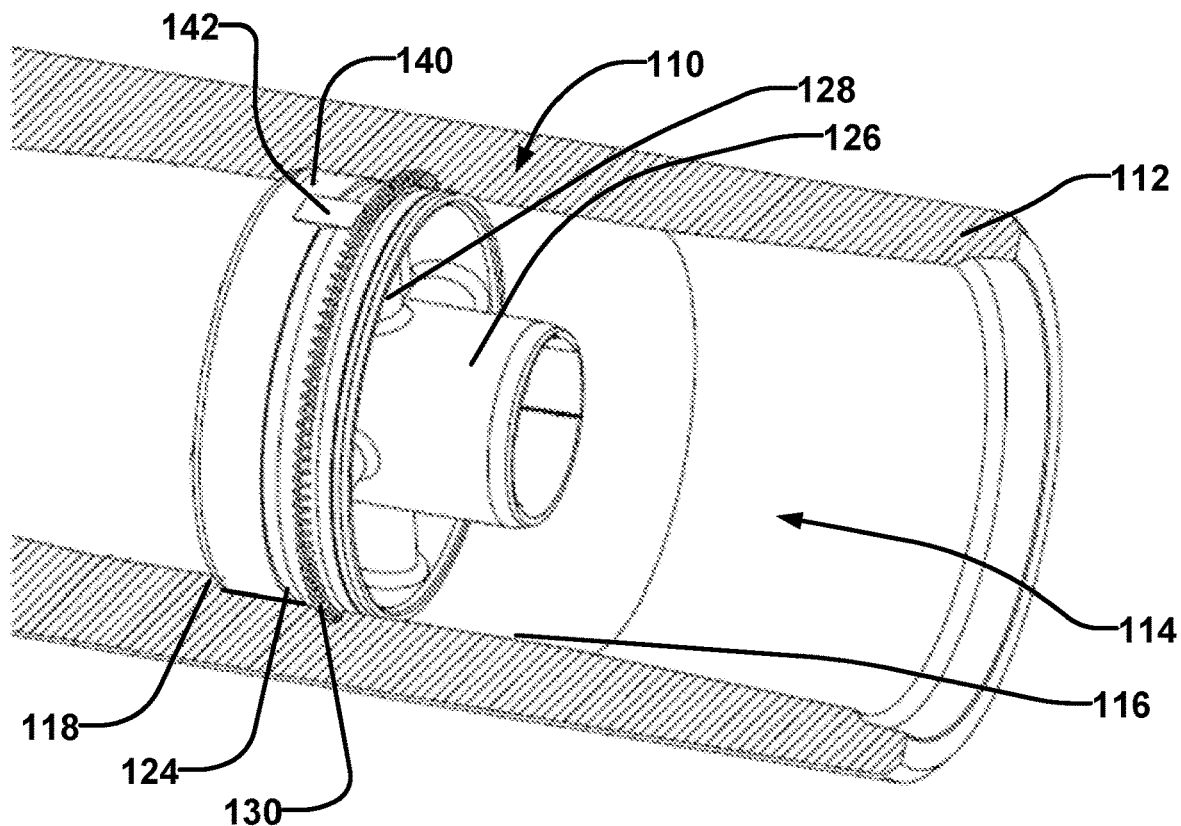
FIG. 6a is a perspective view, partly transparent, of an exemplary embodiment illustrating a ring having a replaceable, axially extending insert, and a spring.
Figure 6B:
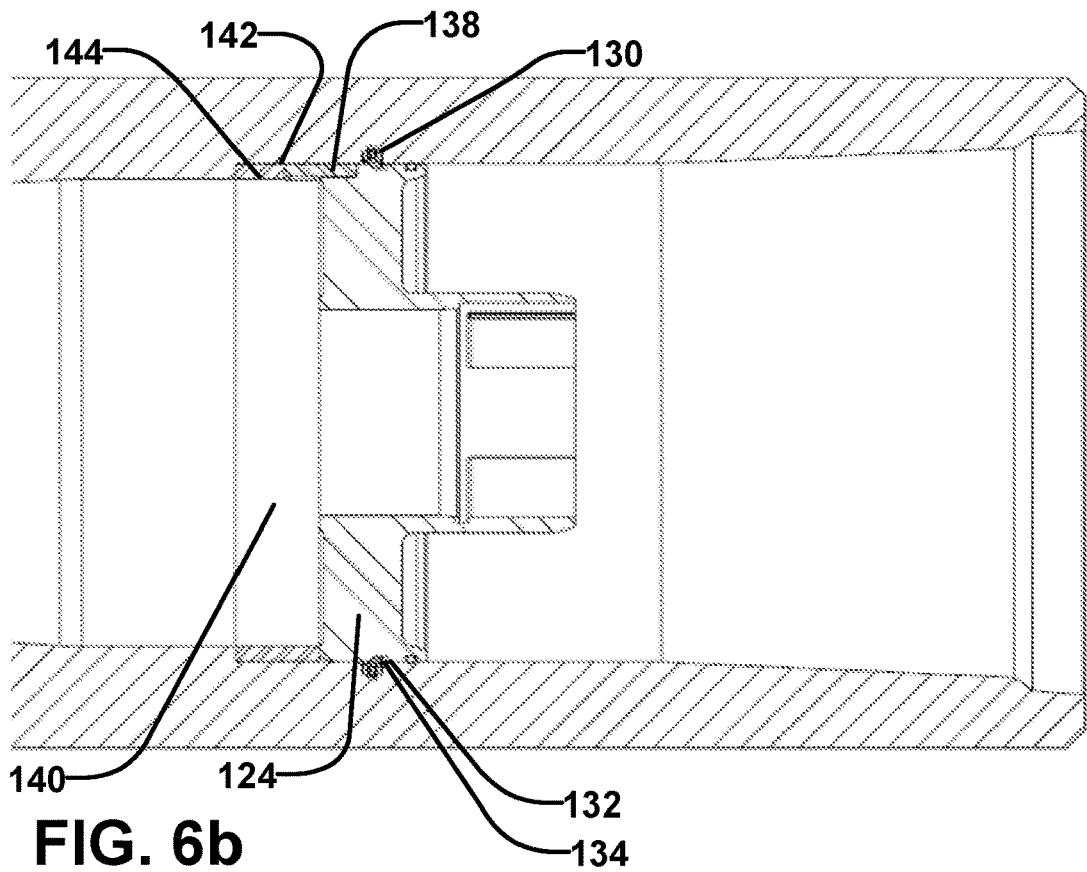

FIG. 5 provides a partially exploded view of the embodiment of FIGS. 3b to 4b, clearly showing the insert 136 and the corresponding recess 138. It will be clear to those skilled in the art that more than one insert 136 can be employed, for example to provide additional stress-bearing components external to the spider 120.

Figure 7A:
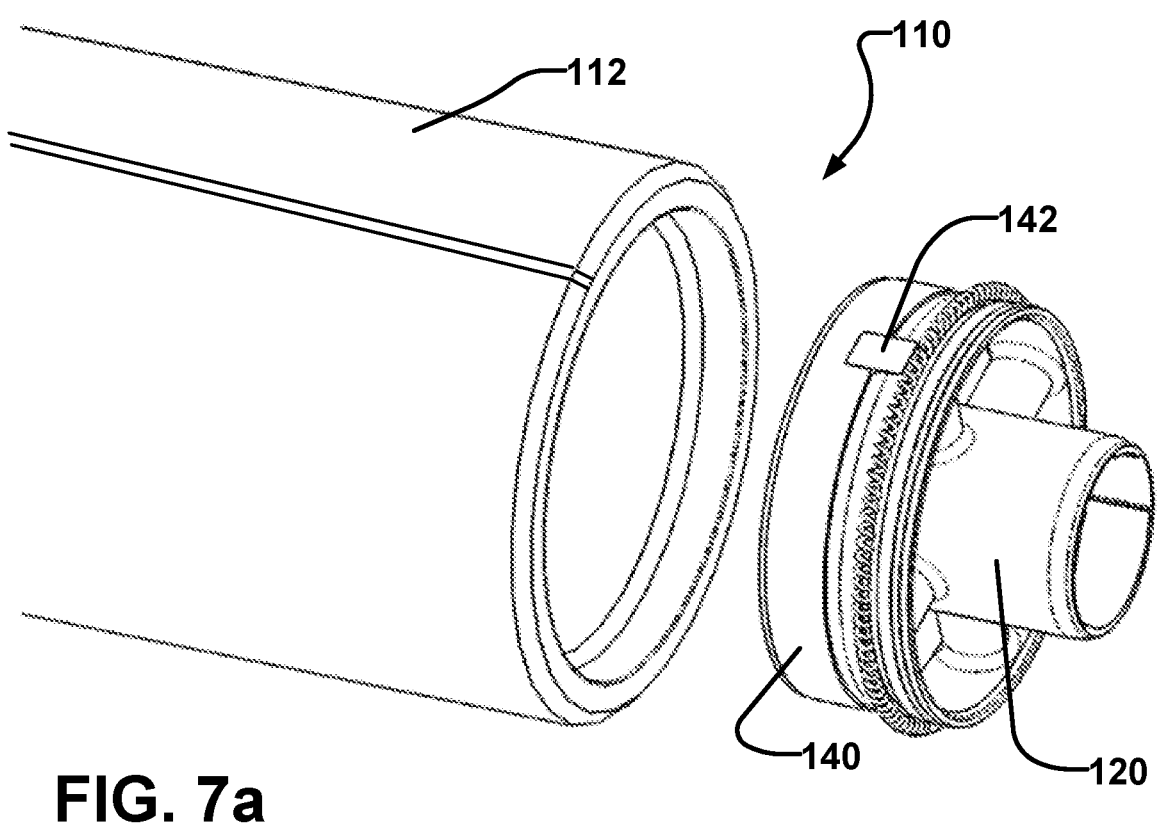
FIG. 7a is a perspective view of the embodiment of FIGS. 6a and 6b with the assembly removed from the tubular section.
Figure 7B:
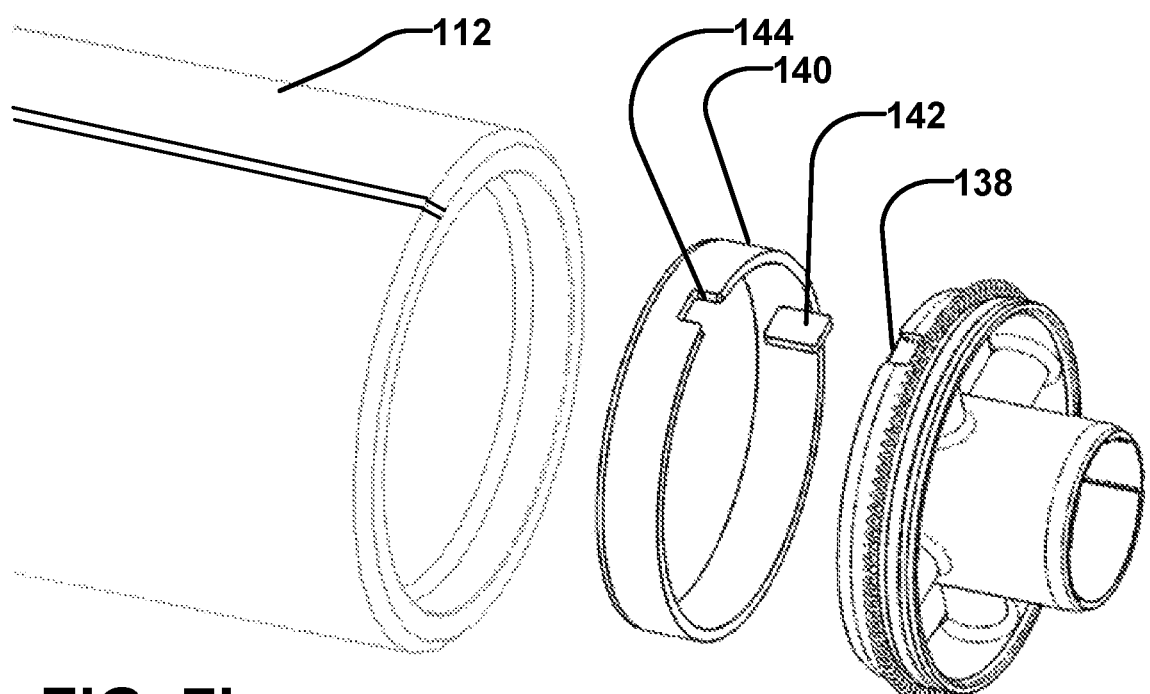

In addition, it will be clear that the inserts need not be integral to the press-fit ring, but can instead be discrete, separately manufactured components designed to engage recesses on the ring and the spider. Discrete inserts may provide the advantage of easier replaceability when worn; alternatively, if the recesses become worn larger inserts can be employed to fit the now-larger recesses. Turning to FIGS. 6a to 7b, such an alternative embodiment is illustrated. The inner wall 116 still comprises a shoulder 118 for acting as an axial stop for a press-fit ring 140, but the ring 140 itself is provided with a recess 144 for receiving one end of a discrete insert 142. This is best shown in FIG. 7b. In use, the insert 142 would be inserted into the recess 144 in the ring 140, which may be a slip-fit or press-fit engagement, and then the ring 140 would be inserted within the interior space 114 until abutting the shoulder 118. The spider 120 would then be provided with the spring 130 in the channel 132, and the spider 120 would be inserted until adjacent the insert 142. After rotating the spider 120 until the insert 142 aligns with the recess 138, the spider is pressed against the ring 140, engaging the insert 142 within the recess 138 (which may be a slip-fit or press-fit engagement) and the spring 130 within the channel 134 in the inner wall 116, thus axially and rotationally locking the spider 120 in the desired location within the interior space 114.

In a yet further series of embodiments, illustrated in FIGS. 8a-10c, corresponding recesses are provided in the tubular member inner wall and the peripheral portion of the spider, in which inserts of various shapes can be provided in order to axially and rotationally secure the spider within the interior space.

Figure 8A:
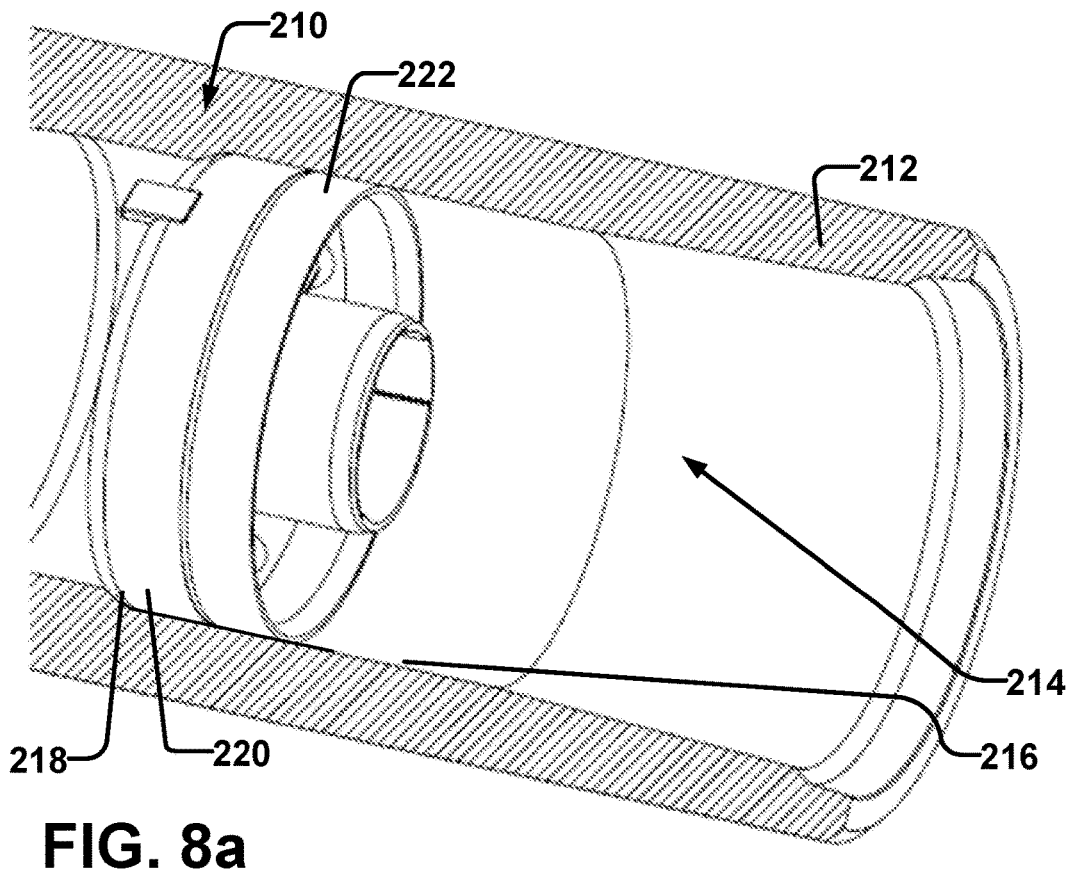
FIG. 8a is a perspective view, partly transparent, of an exemplary embodiment illustrating a discrete, replaceable, axially extending insert in corresponding recesses in the retention member and inner wall.
Figure 8B:
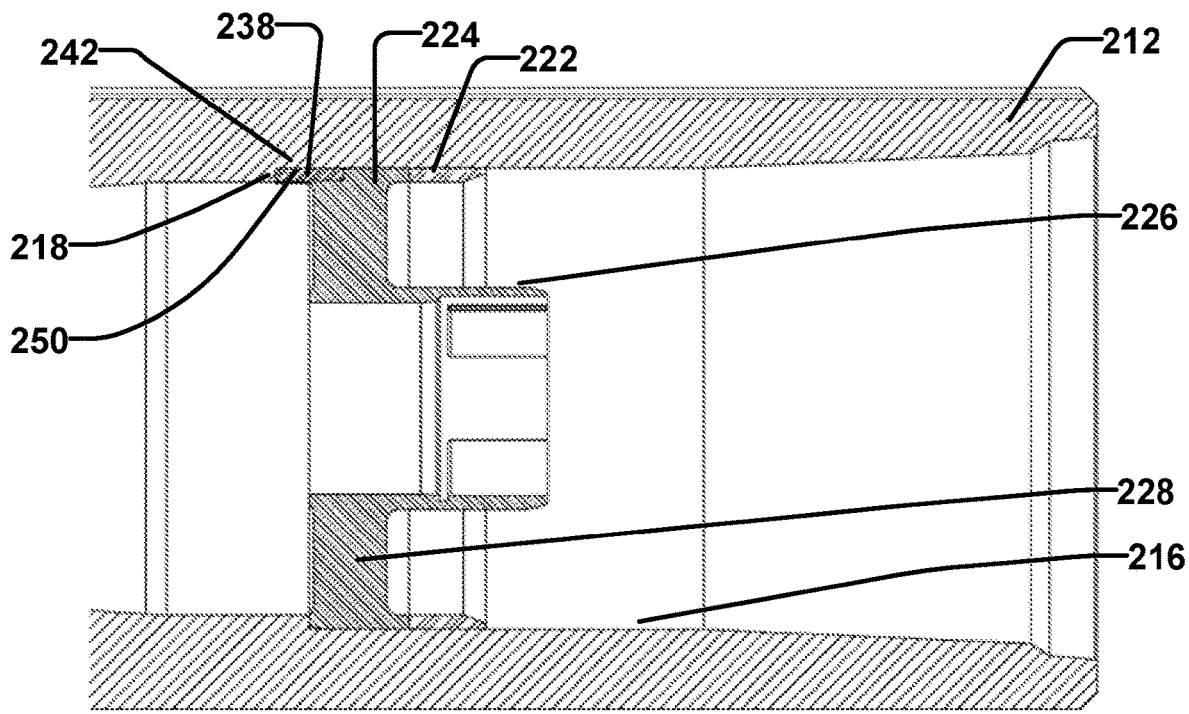

Turning to FIGS. 8a and 8b, an assembly 210 is shown inserted within a tubular member 212. The tubular member 212 comprises an interior space 214 defined by an inner wall 216. While the inner wall 216 is shown as comprising a shoulder 218 as an axial stop, it will be clear that the shoulder 218 is not necessary depending on the configuration and location of the inserts.

In this embodiment, a spider 220 is sized and configured for slip-fit engagement against the inner wall 216. The spider 220 comprises a peripheral portion 224, an inner portion 226, and connective members 228 for connecting the peripheral and inner portions 224, 226. The peripheral portion 224 is provided with recesses 238 for receiving inserts 242. The inserts 242 are discrete, generally rectangular components that are sized and configured for receipt within the corresponding recesses 238, which may be a slip-fit or press-fit engagement. When installed in the peripheral portion 224, the inserts may extend beyond the end of the spider 220 (as in FIG. 8b) or may extend no further than the end of the spider (as in FIG. 9b). The inner wall 216 is also provided with corresponding recesses 250 sized and configured for receipt of the inserts 242.

In use, the inserts 242 would be inserted into the recesses 238 in the spider 220, and then the spider 220—with the inserts 242 pointing in the direction of insertion—is inserted into the interior space 214 until the inserts 242 are adjacent the recesses 250 in the inner wall 216. Upon rotating the spider 220 until the inserts 242 align with the recesses 250, the spider 220 can then be pressed further until the inserts 242 engage the recesses 250, which may be a slip-fit or press-fit engagement. As indicated above, while the illustrated embodiment also shows the spider 220 coming to abut the shoulder 218, this feature may not be necessary if the inserts/recesses interface provides sufficient axial securing of the spider 220 within the interior space 214. The inserts 242 can be designed to provide axial and rotational locking of the spider 220 within the interior space 214.

After insertion of the spider 220, a press-fit ring 222 is inserted into the interior space 214. The ring 222 is sized and configured for press-fit engagement with the inner wall 216, and thus upon abutting the spider 220 the ring 222 can provide further axial locking of the spider 220. It should be noted that the ring 222 may not be required in every embodiment, as the inserts 242 may provide sufficient axial locking functionality.

FIGS. 9a to 10c provide an alternative embodiment to that illustrated in FIGS. 8a and 8b. In FIGS. 9a to 9d, the inserts are shown as having different shapes; this variation in a single drawing is for illustrative purposes only, and it will be understood that normally one would use a single insert shape consistently for a particular tool. In the illustrated embodiment, the assembly 210 is again shown received within the interior space 214 of the tubular member 212, with the assembly 210 engaging the inner wall 216. However, this alternative embodiment differs in two ways from the embodiment of FIGS. 8a and 8b. First, the recesses 238, 250 do not extend axially beyond the end of the spider 220. Second, the inserts are of different shapes than the generally rectangular inserts 242 of FIGS. 8a and 8b.

Figure 9A:
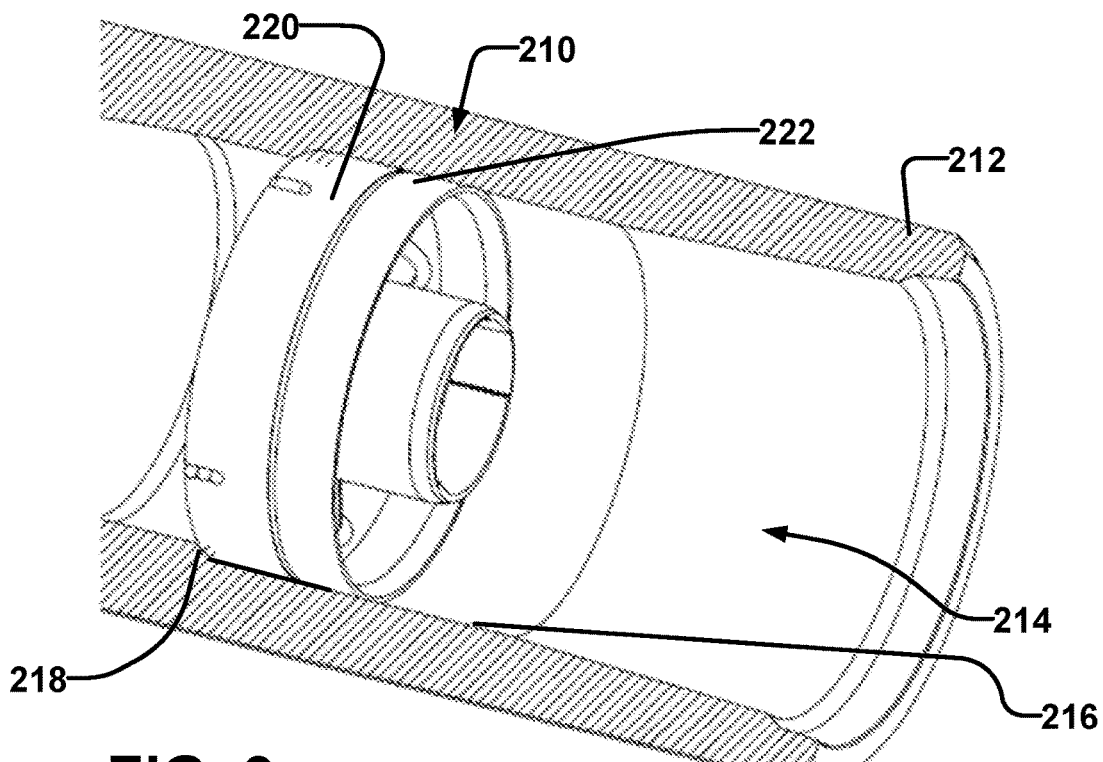
FIG. 9a is a perspective view, partly transparent, of an exemplary embodiment illustrating discrete cylindrical and spherical inserts in corresponding recesses in the retention member and inner wall.
Figure 9B:
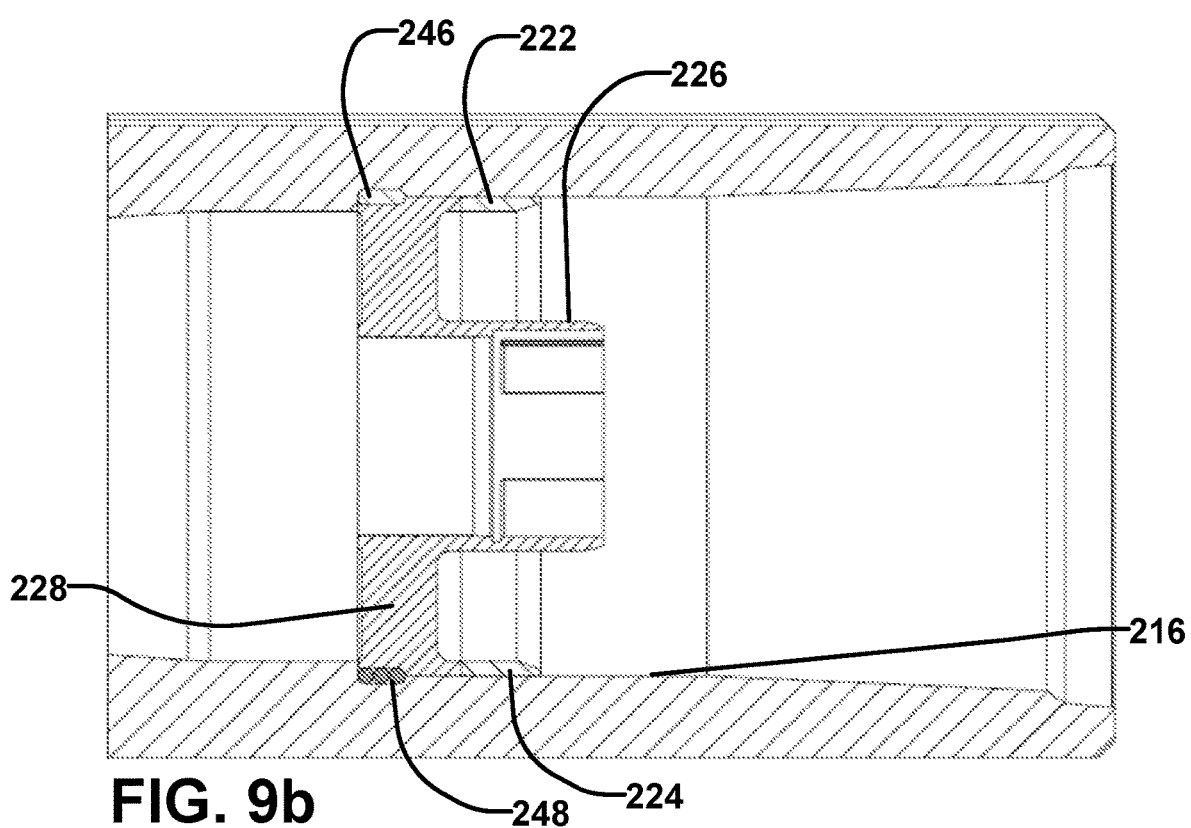
Figure 9C:
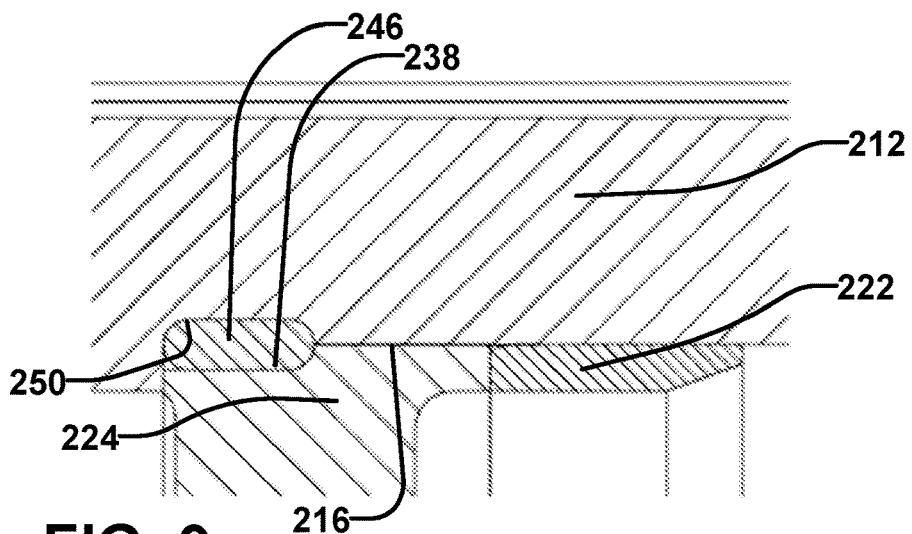
FIG. 9c is a detailed sectional view illustrating the discrete cylindrical insert in the corresponding recesses of FIGS. 9a and 9b.
Figure 9D:
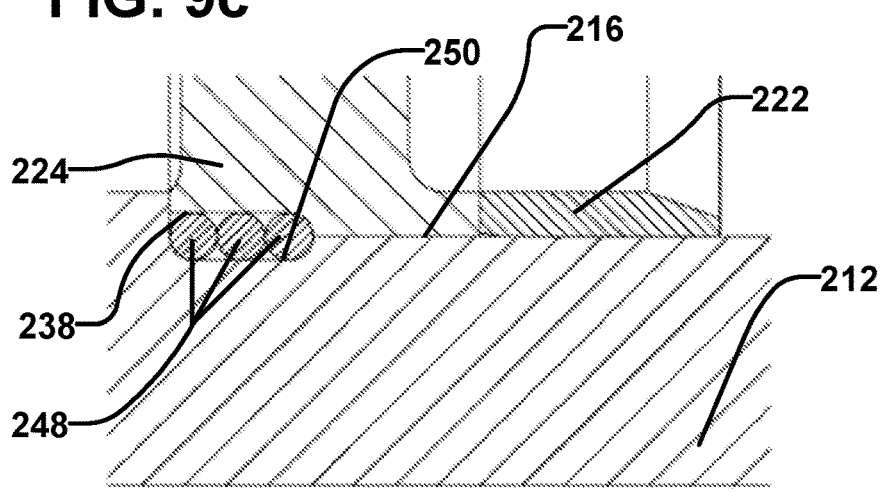
FIG. 9d is a detailed sectional view illustrating the discrete spherical inserts in the corresponding recesses of FIGS. 9a and 9b.
Figure 10A:
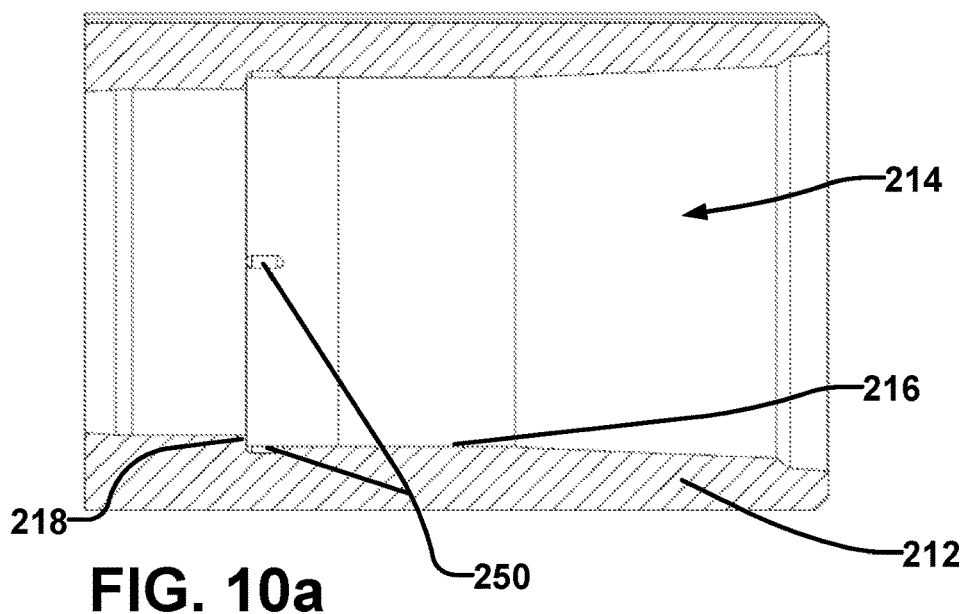
FIG. 10a is a sectional view illustrating recesses on the inner wall.
Figure 10B:
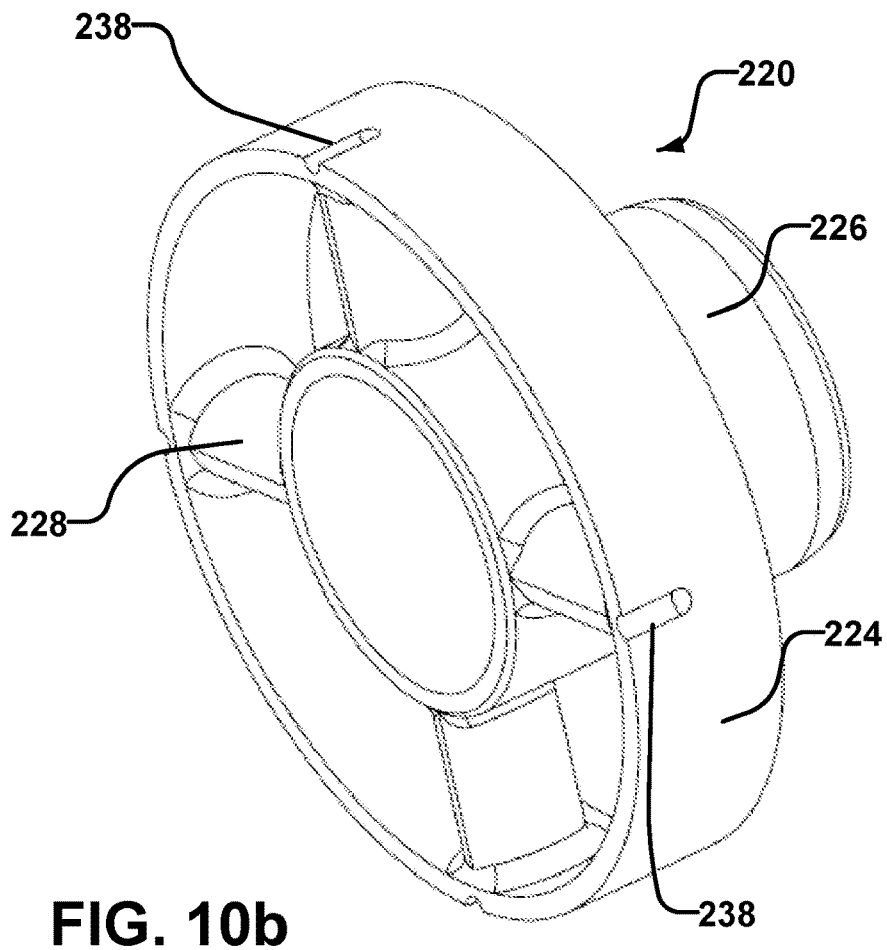
FIG. 10b is a perspective view illustrating recesses on the retention member.

As can be seen in FIGS. 9b and 9d, the recesses 238, 250 can be configured to receive three discrete spherical inserts 248. In addition to illustrating the diversity of insert shapes that can be included within the scope of the present invention, the use of spherical inserts 248 demonstrates one situation where it might be necessary to ensure that the recesses 238, 250 do not extend beyond the end of the spider 220, as otherwise the spherical inserts 248 may be lost from the extended end of the recesses 238, 250. By terminating the recesses 238, 250 at or before the end of the spider 220, the spherical inserts 248 can be retained and serve their rotational locking function. Alternatively, the use of a shoulder 218 can be used to retain the inserts within the recesses 238, 250. FIGS. 10a and 10b illustrate the inner wall 216 and spider 220, respectively, showing the recesses 250, 238.

Figure 10C:
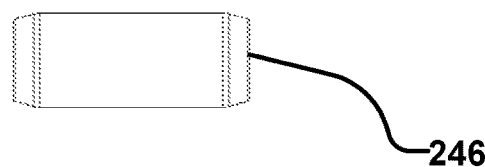
FIG. 10c is a side elevation view of various shaped inserts.
Figure 10C:
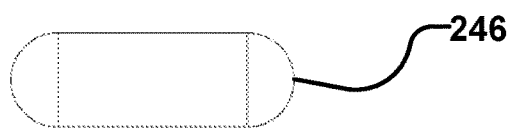
Figure 10C:
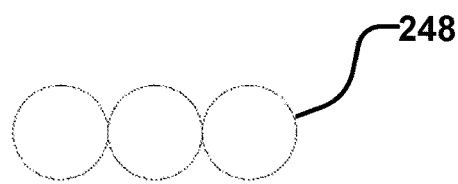

FIGS. 9b and 9c illustrate a different insert shape, specifically showing a cylindrical insert 246 with rounded ends. FIG. 10c illustrates cylindrical inserts 246 of tapered and rounded ends, as well as the spherical inserts 248.

Figure 11A:
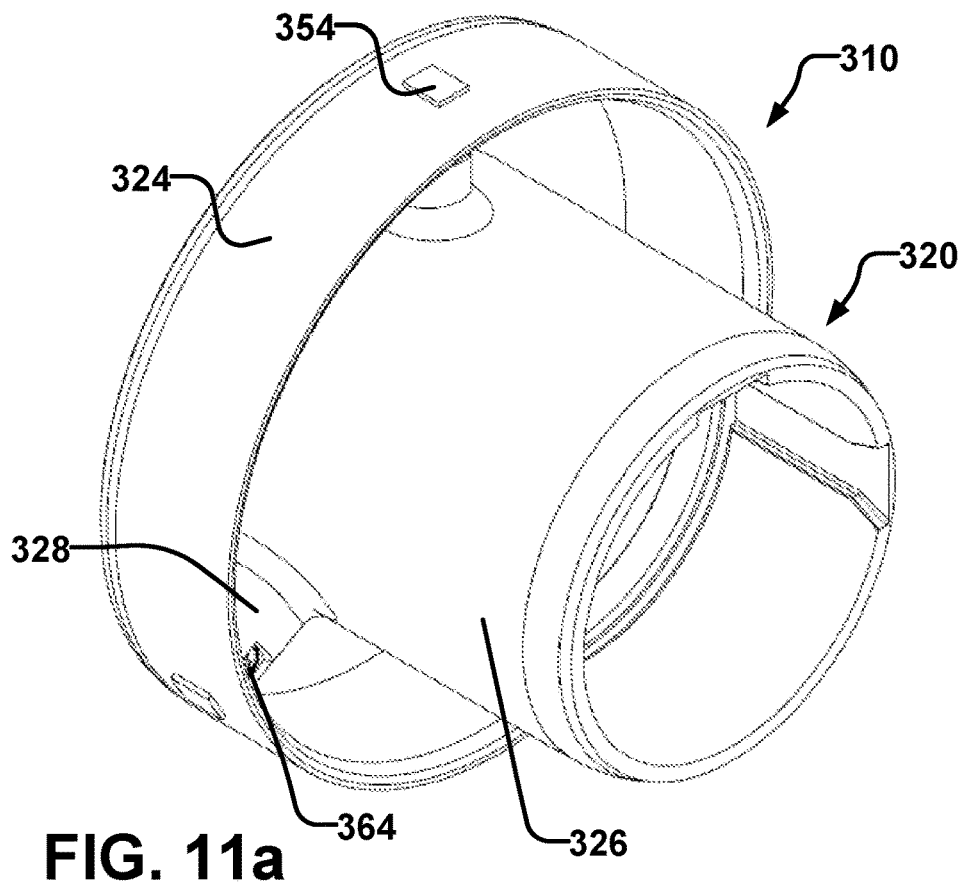
FIG. 11a is a perspective view of an exemplary embodiment of a retention member having radially-extendable inserts.

In a still further embodiment, as illustrated in FIGS. 11a to 13b, the inserts are configured to extend radially out of the spider into corresponding recesses in the inner wall. Referring now to FIGS. 11a to 11c, an assembly 310 is illustrated. The assembly 310 comprises a spider 320, the spider comprising a peripheral portion 324, an inner portion 326, and connecting members 328 connecting the peripheral and inner portions 324, 326. The inserts take the form of slidable outer members 354, as described in detail below.

Figure 11B:
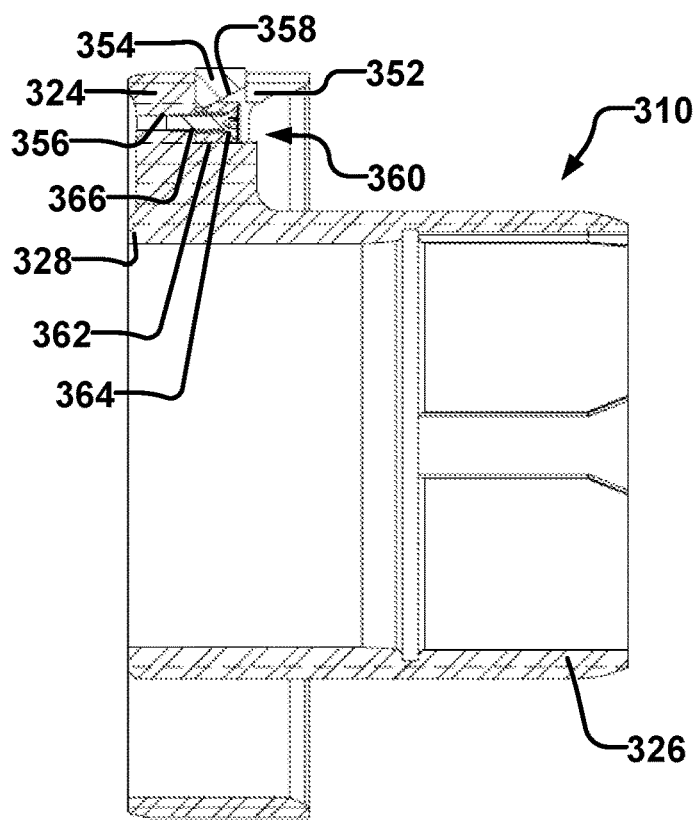
Figure 11C:
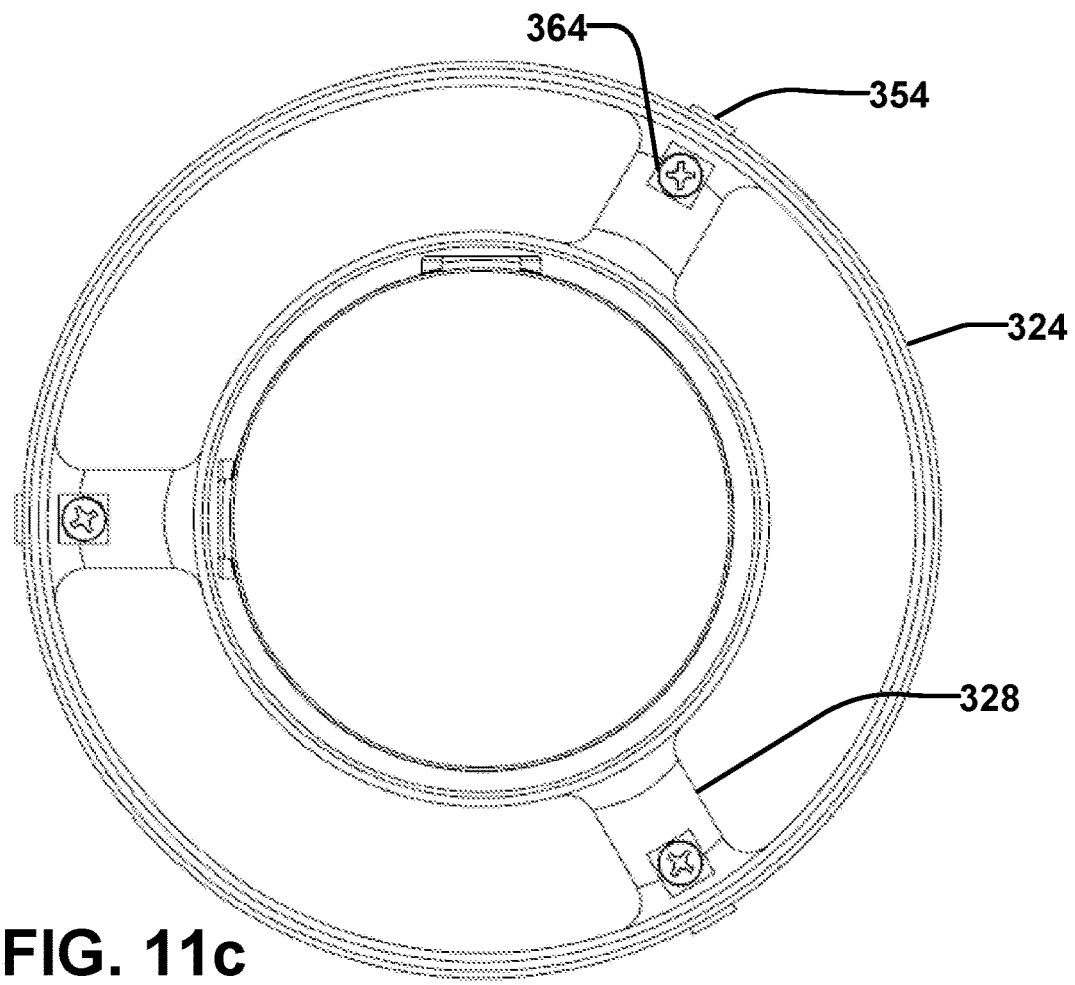
FIG. 11c is an elevation view of the embodiment of FIGS. 11a and 11b.

As can be seen in FIG. 11b, each connecting member 328 and adjacent section of the peripheral portion 324 houses an axial channel 360 and a radial channel 362. The axial channel 360 extends axially through the spider 320, and the radial channel 362 extends radially outwardly from the axial channel 360. The axial channel 360 comprises a section for retaining a slidable inner member 352, and a threaded section 366. A screw 364 extends through the inner member 352 and into the threaded section 366, such that rotating the screw 364 in one direction moves the inner member 352 in a first axial direction $D_a$ in the channel 360, while backing the screw 364 off moves the inner member 352 in an opposite direction. The inner member 352 is disallowed from moving in a radial direction by the channel 360 and by connection to the screw 364. The radial channel 362 comprises a section for retaining the outer member 354 and allowing slidable movement in a radial direction $D_r$. The outer member 354 is disallowed from moving in an axial direction by the channel 362.

Figure 12A:
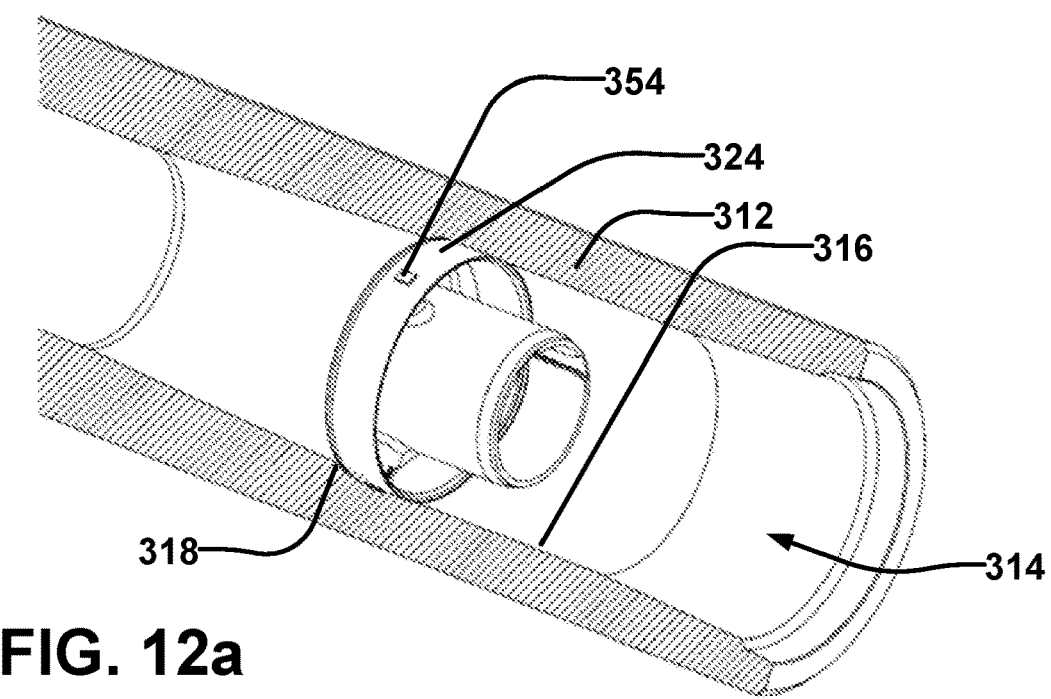
FIG. 12a is a perspective view, partly transparent, of the embodiment of FIG. 11a in a tubular section.
Figure 12B:
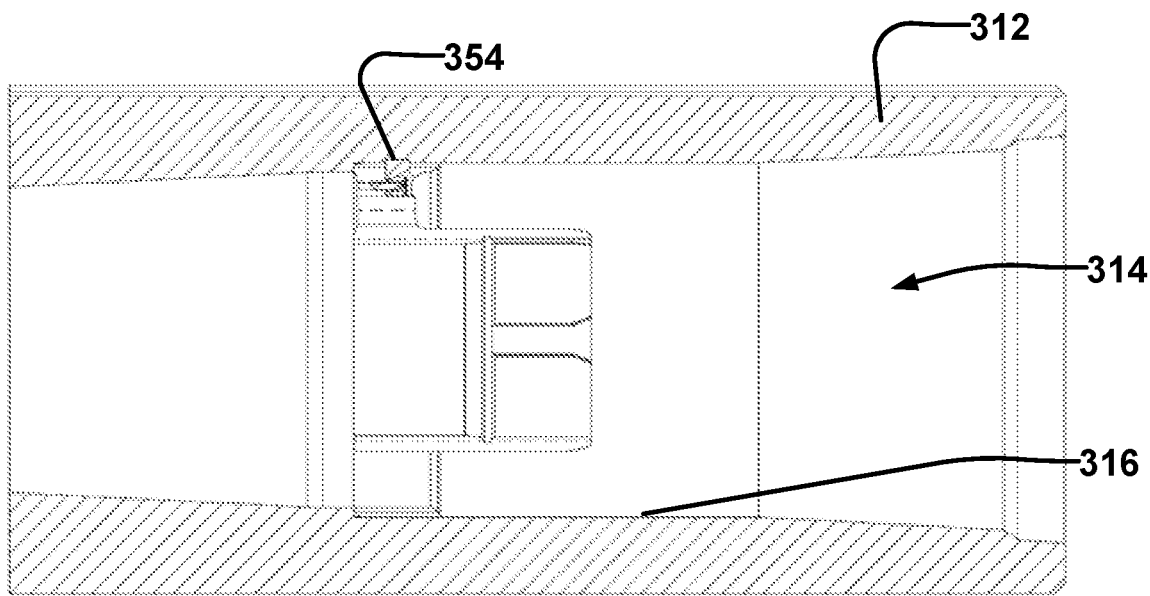
Figure 12C:
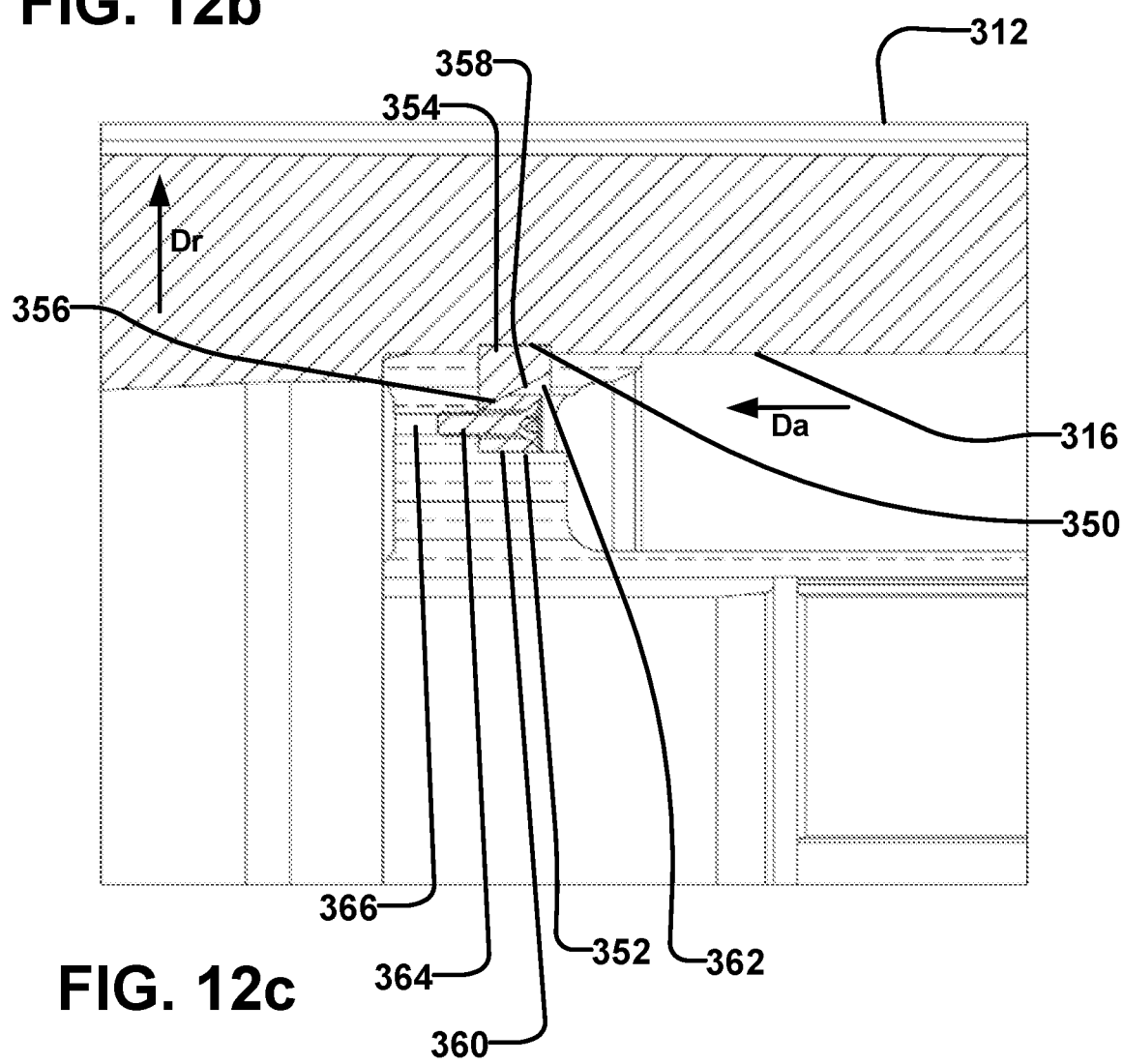
FIG. 12c is a detailed sectional view of the securing means of FIGS. 12a and 12b.
Figure 13A:
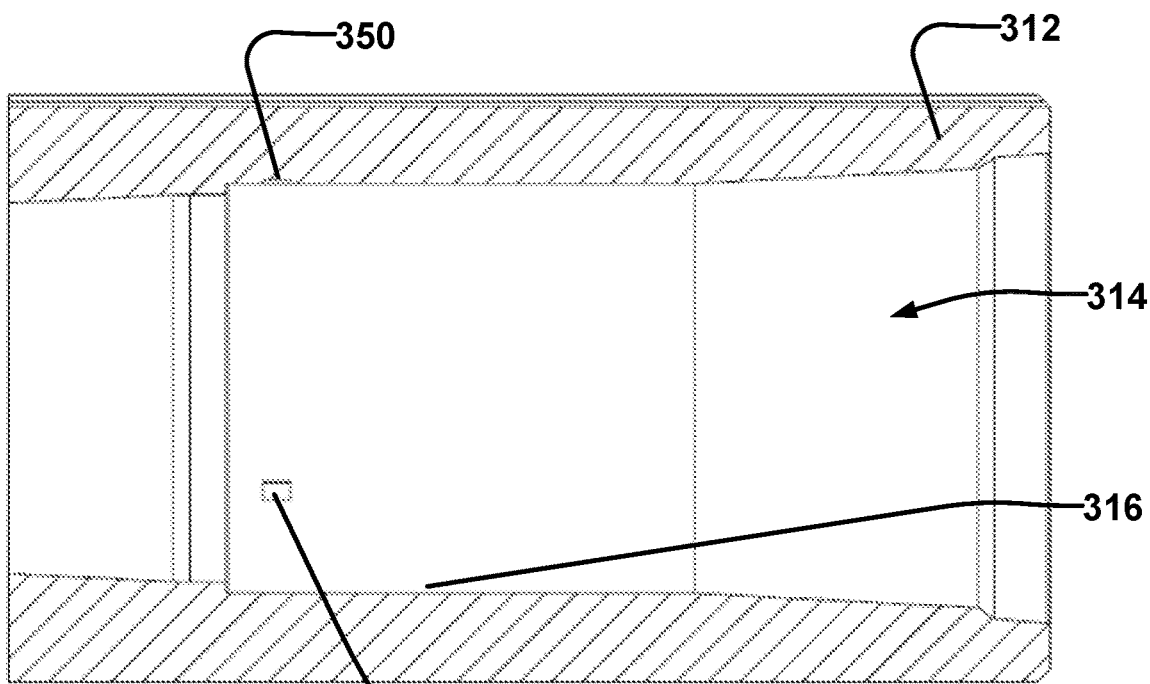
FIG. 13a is a sectional view illustrating the recesses in the inner wall.
Figure 13B:
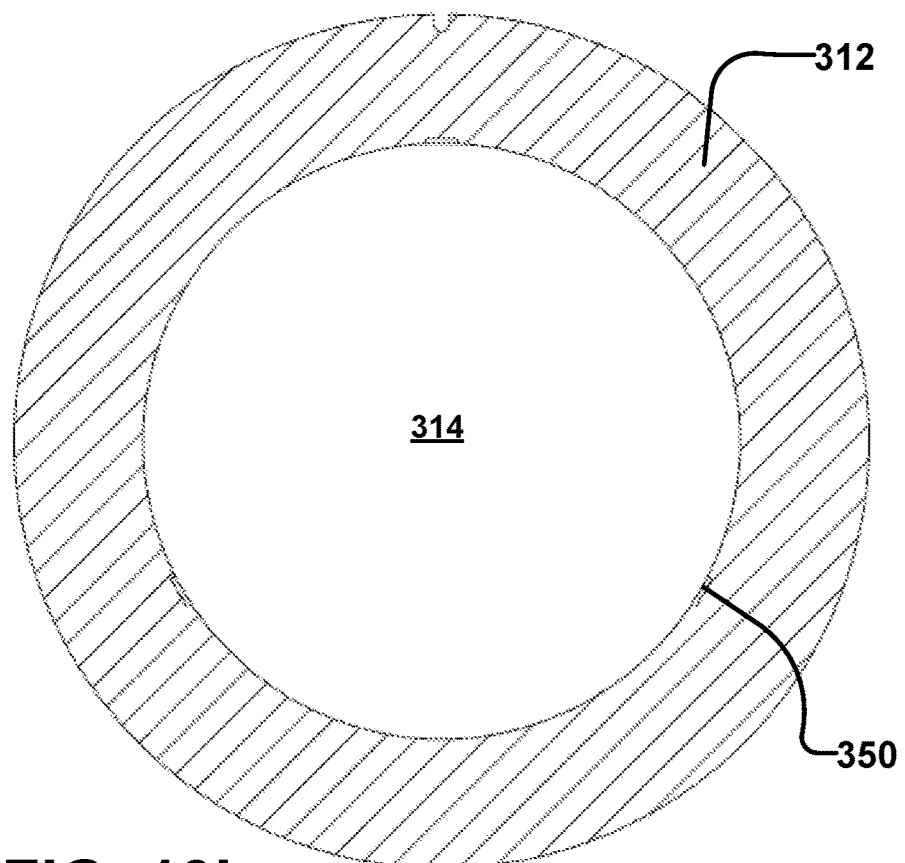
FIG. 13b is a sectional view illustrating the recesses in the inner wall.

The inner member 352 comprises an inner member face in the form of an outward angled face 356 (which can be seen in detail in FIG. 12c). The outward angled face 356 is angled outwardly and in the axial direction $D_a$. The outer member 354 comprises an outer member face in the form of an inward angled face 358, which is angled inwardly and toward the outward angled face 356 of the inner member 352. As can be seen, the outward angled face 356 is in facial contact with the inward angled face 358.

By rotating each of the screws 362, the inner members 352 are moved in the axial direction $D_a$ within their respective axial channels 360. As the inner and outer members 352, 354 are in angled contact where the outward and inward angled faces 356, 358 meet, moving the inner members 352 in the axial direction $D_a$ causes the outward angled faces 356 to press against the inward angled faces 358, thus causing the outer members 354 to be forced radially outwardly within their respective radial channels 362. The outer members 354 thus extend outwardly past the circumferential extent of the peripheral portion 324 of the spider 320. As will be clear from the illustrated embodiment, the outer members 354 are sized and configured such that only the outermost portion of each outer member 354 extends beyond the peripheral extent of the spider 320, such that a portion of each outer member 354 remains retained within its respective radial channel 362.

It will be clear to those skilled in the art that the above-described embodiment is merely exemplary and that numerous related arrangements can be conceived of using the same general concept. For example, the inner member face and/or outer member face could be rounded rather than angled as illustrated, so long as they could engage each other to force the outer member outwardly. As a further example, the inner member could be the screw itself provided with a leading edge comprising an interface surface that presses against the outer member face and causes the outer member to move radially outwardly into the corresponding recess. Any number of similar mechanisms could be employed, so long as the outer member is forced outwardly and into engagement with the corresponding recess.

Turning now to FIGS. 12a to 12c, the assembly 310 is shown in the tubular member 312, within the interior space 314 defined by the inner wall 316. While the inner wall 316 is shown as comprising an internal upset or shoulder 318 to provide an axial landing for the assembly 310, this is not a required feature to secure the assembly 310 within the interior space 314. The inner wall 316 comprises recesses 350, as can be clearly seen in FIGS. 13a and 13b, and the shoulder 318 can optionally be used to position the assembly 310 at the location within the interior space 314 to enable the insertion of the outer members 354 in the corresponding recesses 350.

In use, the assembly 310 is inserted into the interior space 314, in slip-fit engagement with the inner wall 316. When the assembly 310 abuts the shoulder 318—or, if the shoulder 318 is not present, when the assembly 310 has reached the level of the recesses 350—the assembly 310 is rotated to align the outer members 354 with the recesses 350. Once aligned, the screws 364 can be rotated to move the three inner members 352 in the axial direction $D_a$. As described above, this axial movement causes the outward angled faces 356 of the inner members 352 to press against the inward angled faces 358 of the corresponding outer members 354, thus forcing the outer members 354 to move radially outwardly in the radial direction $D_r$.

As the outer members 354 and corresponding recesses 350 are aligned, the outer members 354 will then be moved outwardly into engagement with the recesses 350, thus axially and rotationally securing the spider 320 within the interior space 314.

While not shown in the Figures, the assembly 310 may also comprise a biasing mechanism whereby each outer member 354 is biased away from its respective recess 350, such that backing off the screw 364 releases the outer members 354 from their respective recesses 350 to allow for removal of the spider 320 from the interior space 314.

Various appropriate biasing mechanisms would be obvious to one skilled in the art, and would require a design appropriate to the configuration of the assembly 310.

Figure 14A:
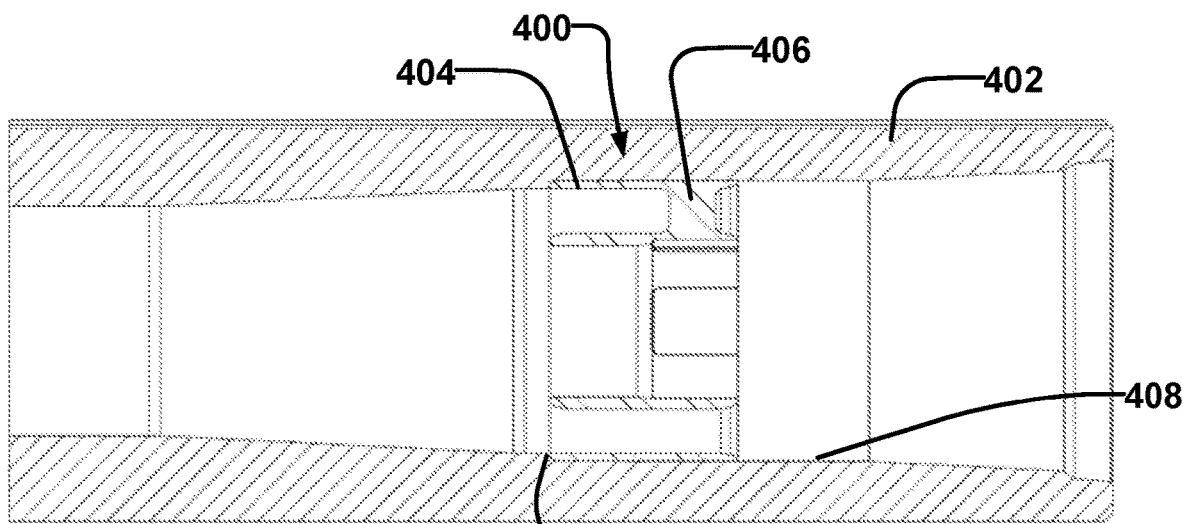
FIG. 14a is a sectional view of an exemplary retention member comprising axially discrete press-fit and slip-fit portions.
Figure 14B:
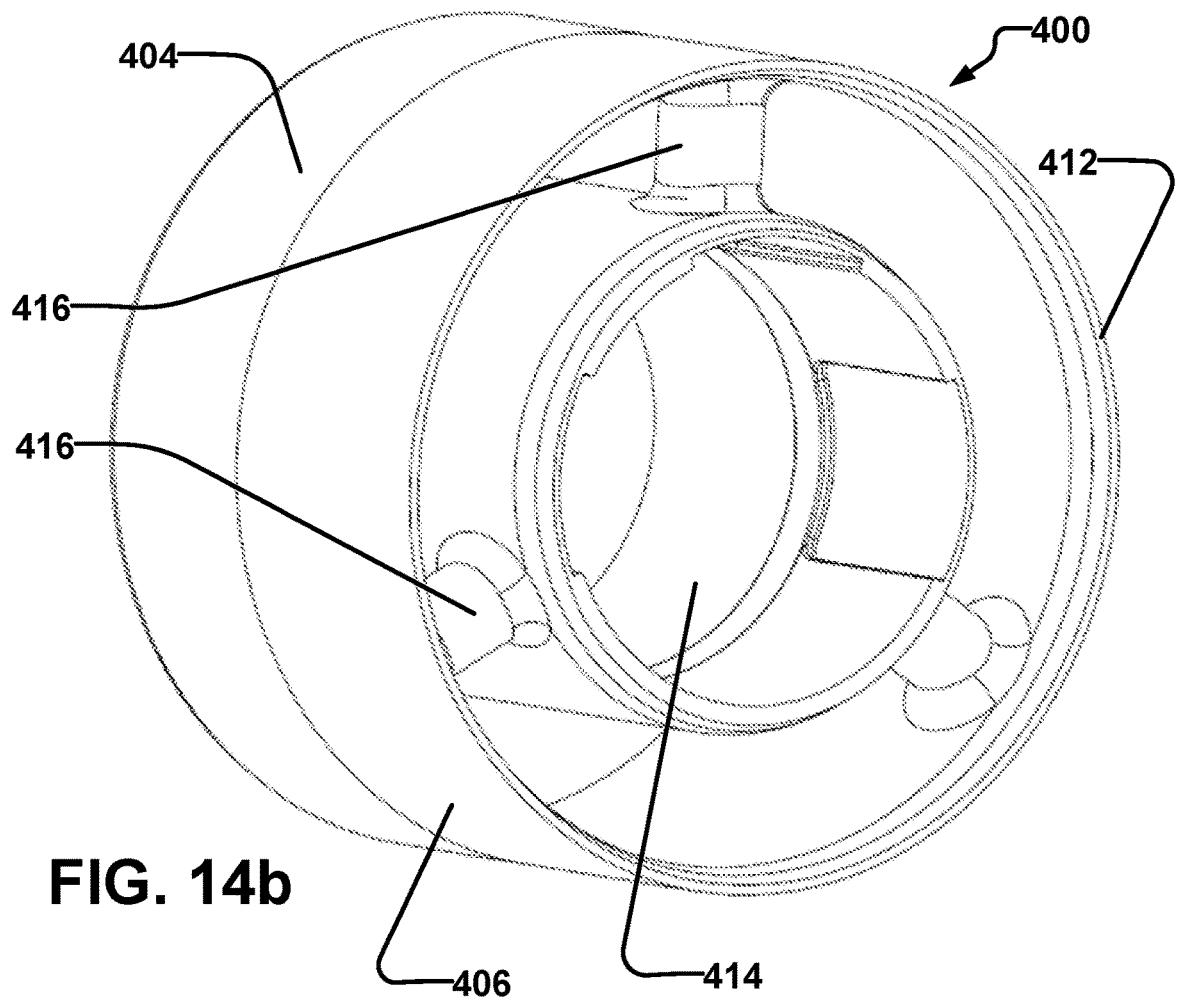
Figure 14C:
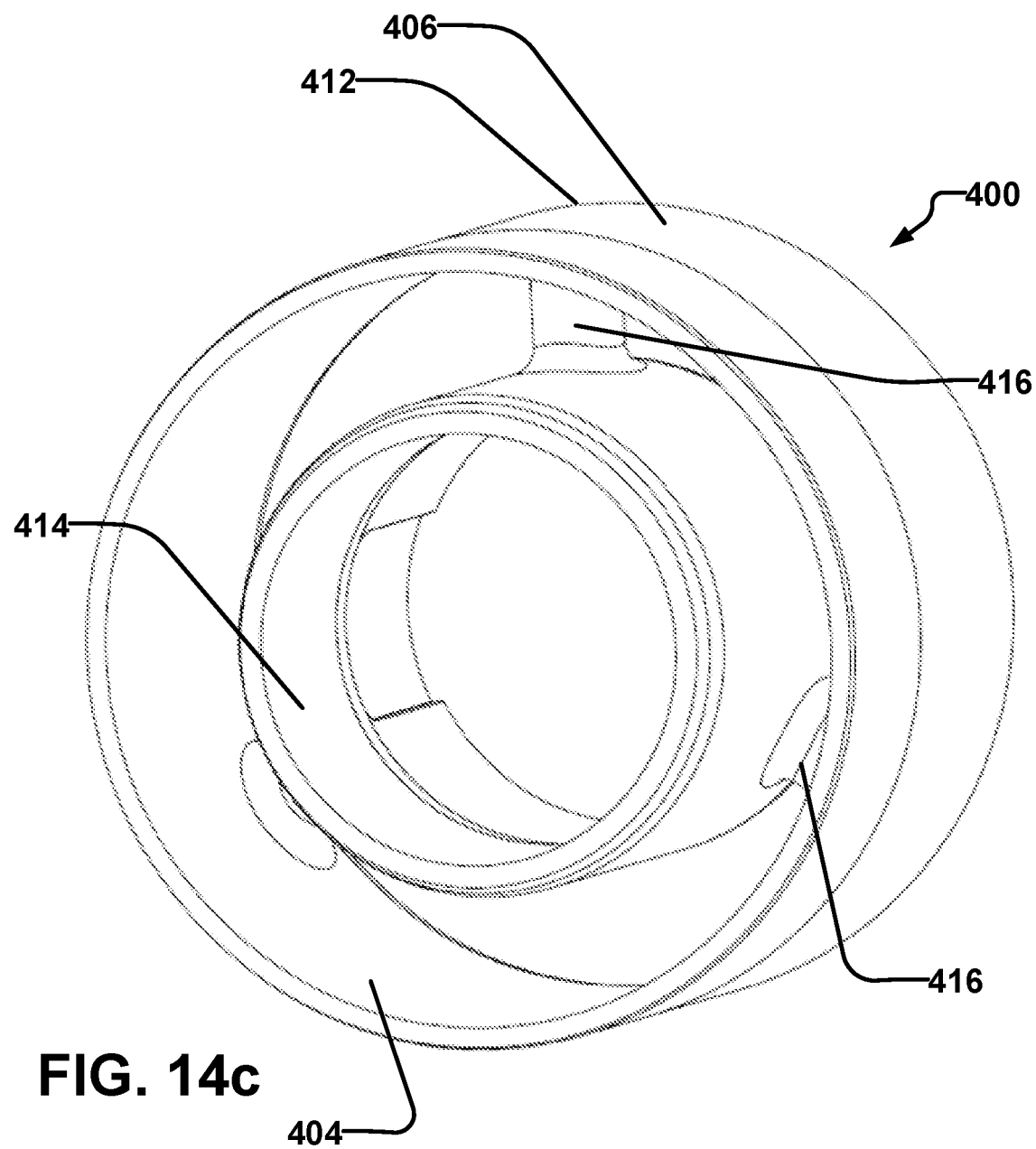

Turning now to FIGS. 14*a* to 14*c*, a further exemplary retention member 400 is illustrated for retaining a probe (not shown) within a tubular member 402. In this exemplary embodiment, the retention member 400 comprises both a slip-fit portion 406 and a press-fit portion 404, axially discrete from but connected to one another. The press-fit portion 404 is configured to securely engage the inner wall 408 of the tubular member 402, and in the illustrated embodiment the press-fit portion 404 abuts the internal upset or shoulder 410 (although it will be clear to those skilled in the art that the slip-fit portion 406 could abut the shoulder 410 if the portions 404, 406 were reversed without impacting the functionality of the embodiment).

As can be seen, the slip-fit portion 406 comprises a peripheral portion 412 for slidable engagement with the inner wall 408, an inner portion 414 for retaining the probe, and three connective members 416 extending between the inner portion 414 and the peripheral portion 412. The press-fit portion 404, which receives most of the stresses from engagement with the tubular member 402, is not directly connected with the connective members 416 or the probe. In this way, the stresses on the slip-fit portion—which retains the probe—are reduced, helping to prevent collapse.

As will be clear from the foregoing, embodiments of the present invention may provide a number of desirable advantages over the prior art. For example, the use of securing means such as inserts and press-fit rings that are external to the spider itself may help to reduce stresses on the spider and reduce the risk of spider collapse. Further, avoiding more costly manufacturing processes such as would be required to provide the spider with keys or splines may be advantageous. Also, using securing means such as inserts and rings may allow for simpler and less expensive maintenance than is the case with the prior art. In addition, axially separating press-fit and slip-fit portions of the retention member to allow for distancing the primary stresses from the probe retention structures may help prevent collapse of the retention member.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

The invention claimed is:

1. An assembly for retaining a cylindrical member within a tubular member, the tubular member having an interior space defined by an inner wall of the tubular member, a surface of the inner wall comprising an upset, the assembly comprising:
   a retention member configured to retain the cylindrical member, the retention member configured for receipt within the interior space and slip-fit engagement against the inner wall; and
   a press-fit ring configured for receipt within the interior space and press-fit engagement against the inner wall to secure the retention member against the upset;
   wherein the press-fit ring comprises at least one axially-extending insert configured for insertion in a corresponding recess in the retention member to rotationally secure the retention member within the interior space.

2. The assembly of claim 1 wherein the tubular member is configured for mating into a drill string.

3. The assembly of claim 1 wherein the tubular member is part of a sub in a drill string.

4. The assembly of claim 1 wherein the upset is a shoulder extending into the interior space at least partially around the surface of the inner wall.

5. The assembly of claim 1 wherein the retention member comprises:
   a peripheral portion for slidably engaging the inner wall;
   an inner portion for retaining the cylindrical member; and
   at least one connective member for connecting the peripheral portion to the inner portion.

6. The assembly of claim 1 further comprising a circumferential spring for securing the retention member against the inner wall, the spring for positioning in corresponding opposed channels in the inner wall and the retention member.

7. The assembly of claim 6 wherein the spring is a canted coil spring.

8. The assembly of claim 1 wherein the at least one axially-extending insert is configured for slip-fit engagement with the corresponding recess.

9. The assembly of claim 1 wherein the at least one axially-extending insert is configured for press-fit engagement with the corresponding recess.

10. The assembly of claim 1 wherein the at least one axially-extending insert comprises a plurality of axially-extending inserts.

11. An assembly for retaining a cylindrical member within a tubular member, the tubular member having an interior space defined by an inner wall of the tubular member, the inner wall having a surface comprising an upset, the assembly comprising:
    a press-fit ring configured for receipt within the interior space and press-fit engagement against the inner wall for abutting the upset;
    a retention member configured to retain the cylindrical member, the retention member configured for receipt within the interior space and slip-fit engagement against the inner wall for abutting the press-fit ring; and
    the press-fit ring comprising at least one axially-extending insert configured for insertion in a corresponding recess in the retention member to secure the retention member within the interior space.

12. The assembly of claim 11 wherein the tubular member is configured for mating into a drill string.

13. The assembly of claim 11 wherein the tubular member is part of a sub in a drill string.

14. The assembly of claim 11 wherein the upset is a shoulder extending into the interior space at least partially around the surface of the inner wall.

15. The assembly of claim 11 wherein the retention member comprises:
    a peripheral portion for slidably engaging the inner wall;
    an inner portion for retaining the cylindrical member; and
    at least one connective member for connecting the peripheral portion to the inner portion.

16. The assembly of claim 11 further comprising a circumferential spring for securing the retention member against the inner wall, the spring for positioning in corresponding opposed channels in the inner wall and the retention member.

17. The assembly of claim 16 wherein the spring is a canted coil spring.

18. The assembly of claim 16 wherein the spring axially secures the retention member within the interior space.

19. The assembly of claim 11 wherein the at least one axially-extending insert comprises a plurality of axially-extending inserts.

20. The assembly of claim 11 wherein the at least one axially-extending insert is integral with the press-fit ring.

21. The assembly of claim 11 wherein the at least one axially-extending insert is a discrete member configured for connection to the press-fit ring.

22. The assembly of claim 11 wherein the at least one axially-extending insert rotationally secures the retention member within the interior space.

23. The assembly of claim 11 wherein the at least one axially-extending insert is configured for slip-fit engagement with the corresponding recess.

24. The assembly of claim 11 wherein the at least one axially-extending insert is configured for press-fit engagement with the corresponding recess.

\* \* \* \* \*